(12) United States Patent
Kikuchi

(10) Patent No.: US 10,091,422 B2
(45) Date of Patent: Oct. 2, 2018

(54) IMAGE PROCESSING DEVICE AND RECORDING MEDIUM

(71) Applicant: Taro Kikuchi, Tokyo (JP)

(72) Inventor: Taro Kikuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 15/226,119

(22) Filed: Aug. 2, 2016

(65) Prior Publication Data

US 2017/0041543 A1 Feb. 9, 2017

(30) Foreign Application Priority Data

Aug. 6, 2015 (JP) .................................. 2015-156282

(51) Int. Cl.
*H04N 5/232* (2006.01)
*G06T 5/40* (2006.01)

(52) U.S. Cl.
CPC ........... *H04N 5/23258* (2013.01); *G06T 5/40* (2013.01); *H04N 5/23274* (2013.01); *G06T 2207/20201* (2013.01)

(58) Field of Classification Search
CPC .. H04N 5/23258; H04N 5/23274; G06T 5/40; G06T 2207/20201
See application file for complete search history.

(56) References Cited

U.S. PATENT DOCUMENTS 7,003,153 B1 * 2/2006 Kerofsky ................. H04N 5/57
348/E5.119
8,885,105 B1 * 11/2014 Cheng ..................... G06T 5/008
348/679

2007/0268534 A1 * 11/2007 Duan ....................... G06T 5/007
358/520
2009/0231632 A1 9/2009 Kikuchi
2011/0292246 A1 * 12/2011 Brunner ................. H04N 5/235
348/231.99
2011/0310116 A1 * 12/2011 Muijs ..................... H04N 5/265
345/617

(Continued)

FOREIGN PATENT DOCUMENTS

| JP | 2006-195651 | 7/2006 |
| JP | 2009-065283 | 3/2009 |
| JP | 2016-126750 A | 7/2016 |

*Primary Examiner* — Jason A Flohre
(74) *Attorney, Agent, or Firm* — Oblon, McClelland, Maier & Neustadt, L.L.P.

(57) ABSTRACT

An image processing device includes an image input unit, a shake-amount measuring unit, a shake correcting unit, a dividing unit, a feature-value calculating unit, and an enhancement processing unit. The image input unit receives an input of an image in chronological order. The shake-amount measuring unit measures an amount of shake of an image. The shake correcting unit corrects shake of the image in accordance with the amount of shake measured. The dividing unit divides the image corrected into multiple areas. The feature-value calculating unit calculates a histogram indicating a feature value of an image, for each of the divided areas. The enhancement processing unit determines processing details of enhancement processing to change a form of the histogram for each of the areas in accordance with the measured amount of shake of the image, and conducts enhancement processing on the area based on the histogram calculated for each area.

8 Claims, 18 Drawing Sheets

(56) References Cited

U.S. PATENT DOCUMENTS

| | | |
|---|---|---|
| 2013/0162688 A1 | 6/2013 | Matsuoka et al. |
| 2014/0071303 A1* | 3/2014 | Hasegawa .......... H04N 5/23287 |
| | | 348/208.11 |
| 2014/0307960 A1* | 10/2014 | Sharma .............. H04N 5/23229 |
| | | 382/162 |
| 2015/0244915 A1 | 8/2015 | Kikuchi |
| 2015/0287174 A1* | 10/2015 | St. Romain, II ........ G06T 5/008 |
| | | 382/169 |
| 2016/0189354 A1 | 6/2016 | Kikuchi et al. |

* cited by examiner

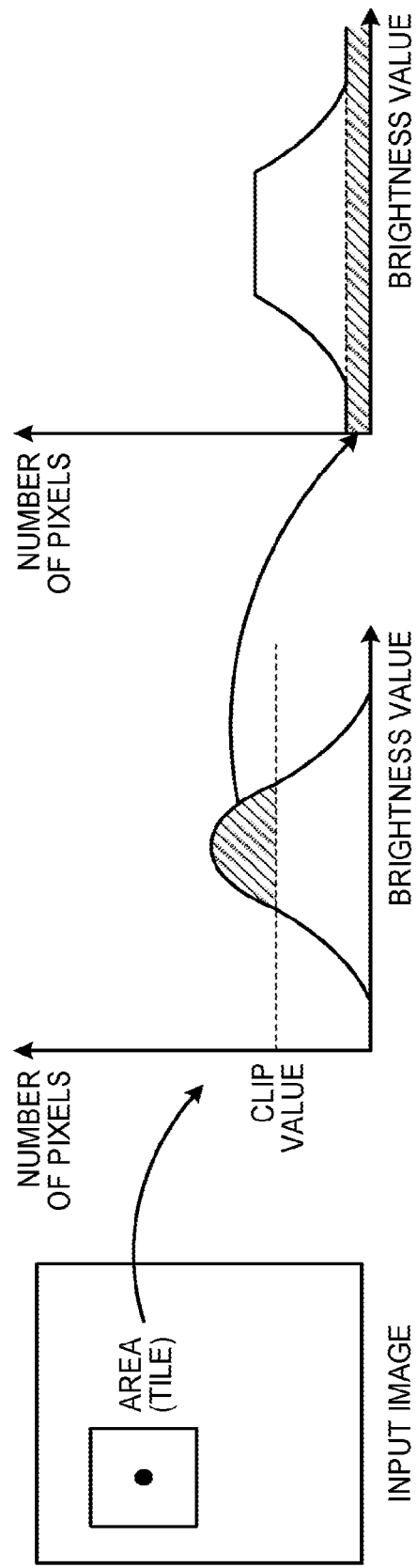

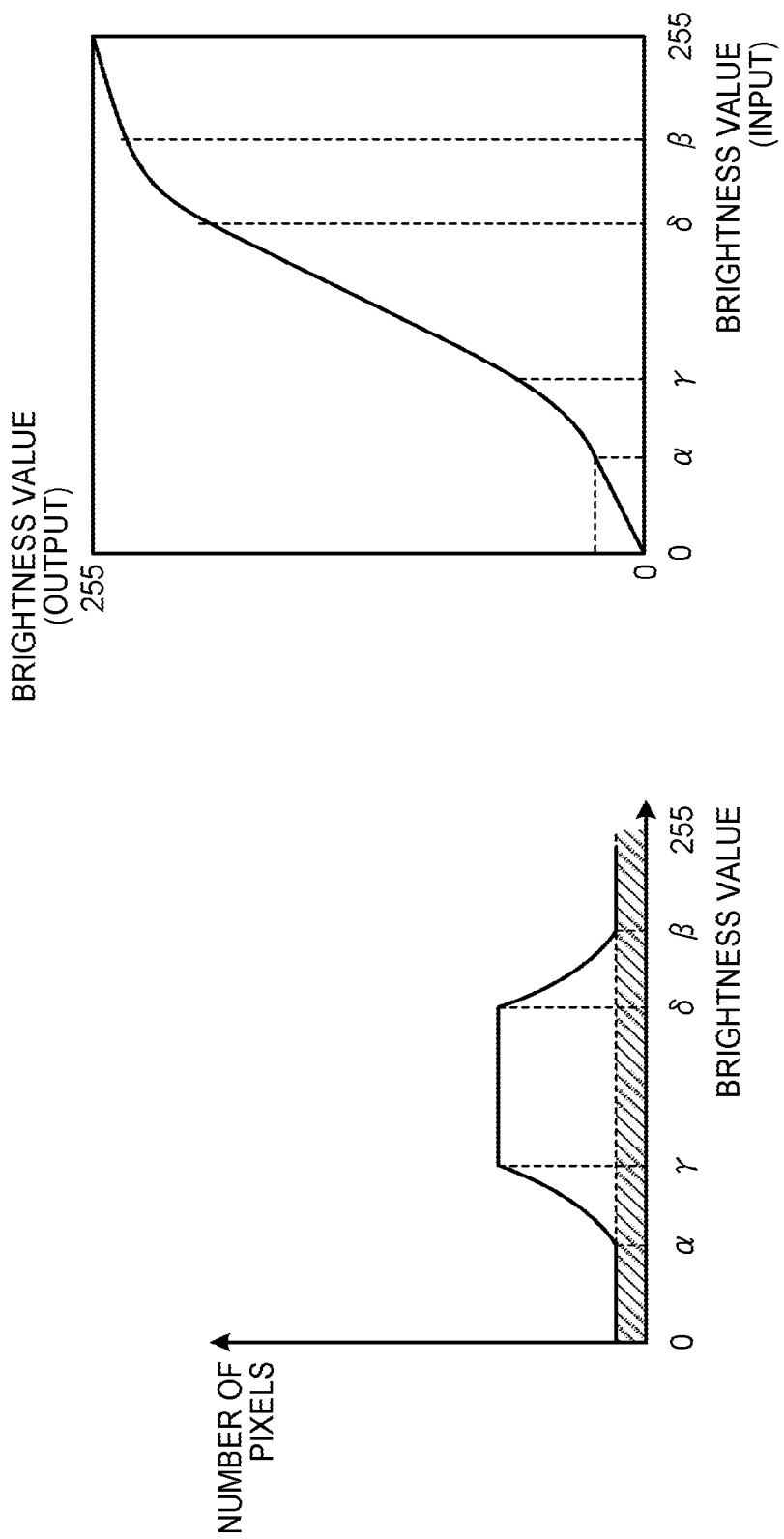

IMAGE PROCESSING DEVICE AND RECORDING MEDIUM

CROSS-REFERENCE TO RELATED APPLICATIONS

The present application claims priority under 35 U.S.C. § 119 to Japanese Patent Application No. 2015-156282, filed Aug. 6, 2015. The contents of which are incorporated herein by reference in their entirety.

BACKGROUND OF THE INVENTION

1. Field of the Invention

The present invention relates to an image processing device and a recording medium.

2. Description of the Related Art

If fog, mist, yellow sand, or PM2.5 occurs when the object, which is the capturing target, outside or at a long distance is captured and observed by a vehicle-mounted camera, monitoring camera, or electronic binoculars, light is scattered and the transmission rate is decreased. As a result, with regard to the object image, the contrast (the difference between light and dark) is reduced, and the visibility is deteriorated.

In order to improve the contrast, there is a conventionally-known technology for dividing an image into areas in accordance with its texture and equalizing the histogram with respect to the divided areas. This technology is called Contrast Limited Adaptive Histogram Equalization (CLAHE) and, during the CLAHE, the restriction is applied to the degree of the contrast enhancement.

For example, Japanese Unexamined Patent Application Publication No. 2006-195651 discloses a gradation correction device with which, in order to prevent excessive correction on background areas, the object, such as face or person, is detected, the restriction on the contrast of the face or person is reduced, and the restriction on the contrast of the others, such as background area, is increased.

Furthermore, when a camera or electronic binoculars is used with hand, if vibration occurs due to camera shake, wind, or the like, the visibility is deteriorated.

In order to improve the visibility against vibrations, there is a conventionally-known optical vibration control technology for reducing shake by detecting the direction of the shake and shifting the lens; or an electronic (image processing) type vibration control technology with which the direction of shake is detected based on the image captured by the camera, and the image is shifted corresponding to the shake.

It is considered that, to improve the visibility with cameras or electronic binoculars, both the vibration control processing and the area-division type enhancement processing, such as CLAHE, are performed in combination.

However, during processing, such as CLAHE, to correct the contrast intensity in accordance with the feature value of each area, the feature value of an area in the peripheral section of the image is different for each frame due to the vibration control, and therefore the correction amount for the contrast intensity is also different for each frame.

The gradation correction device, disclosed in Japanese Unexamined Patent Application Publication No. 2006-195651, has a problem in that while a continuous image, on which both the processes have been conducted, is viewed, flickering occurs in the peripheral section of the image and the visibility is deteriorated, and it is difficult to improve the visibility of images.

SUMMARY OF THE INVENTION

According to one aspect of the present invention, an image processing device includes an image input unit, a shake-amount measuring unit, a shake correcting unit, a dividing unit, a feature-value calculating unit, and an enhancement processing unit. The image input unit receives an input of an image in chronological order. The shake-amount measuring unit measures, in each cycle in which an image is input, an amount of shake of the image. The shake correcting unit corrects shake of the image in accordance with the amount of shake measured. The dividing unit divides the image corrected into multiple areas in accordance with a specified division condition. The feature-value calculating unit calculates a histogram indicating a feature value of an image, for each of the areas divided by the dividing unit. The enhancement processing unit determines processing details of enhancement processing to change a form of the histogram for each of the areas in accordance with the amount of shake of the image measured by the shake-amount measuring unit, and to conduct enhancement processing on the area based on the histogram that is calculated for each of the areas.

BRIEF DESCRIPTION OF THE DRAWINGS

FIGS. 13A to 13C are diagrams that illustrate clipping operation that is performed during contrast adjustment;

FIGS. 15A and 15B are diagrams that illustrate the method of calculating a contrast adjustment curve;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
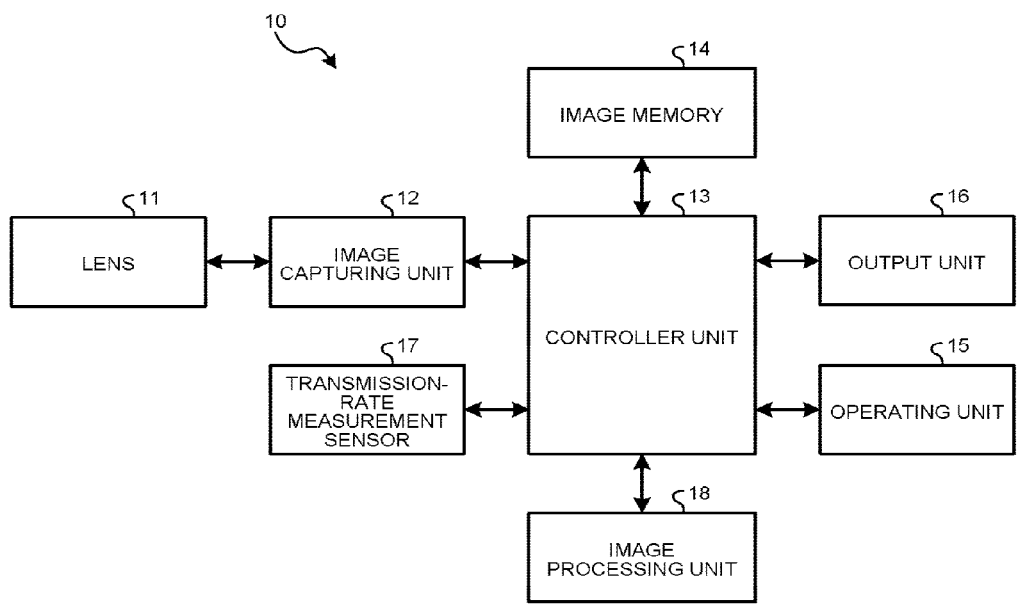
FIG. 1 is a diagram that illustrates an example of the configuration of an image processing device according to a first embodiment.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

An object of an embodiment is to provide an image processing device that is capable of improving the visibility of images without occurrence of flickering in the peripheral section of an image even if both vibration control processing and area-division type enhancement processing are performed in combination.

First Embodiment

FIG. 1 is a diagram that illustrates an example of the configuration of an image processing device according to a first embodiment. An image processing device 10 may be, for example, a digital camera, video camera, digital binoculars, notebook personal computer (PC), tablet terminal, smartphone, mobile phone, or Personal Digital Assistant (PDA). Video cameras include a vehicle-mounted camera and a monitoring camera. The image processing device 10 includes a lens 11, an image capturing unit 12, a controller unit 13, an image memory 14, an operating unit 15, an output unit 16, a transmission-rate measurement sensor 17, and an image processing unit 18.

The image processing device 10 is provided such that the lens 11 faces the object, which is a capturing target, and the shutter button, which is one of the operating units 15, is pressed during capturing. After the shutter button is pressed, the image processing device 10 causes the light, reflected by the object, to enter the image capturing unit 12 through the lens 11. The lens 11 includes multiple lenses, an aperture, and a focal-point adjustment mechanism. The focal-point adjustment mechanism provides an autofocus (AF) function to automatically adjust the focal point.

The image capturing unit 12 receives inputs of images in chronological order. The image capturing unit 12 includes an imaging element, such as a complementary metal oxide semiconductor (CMOS) image sensor or a charge coupled device (CCD) image sensor, for example. The imaging element converts incident light to the voltage whose value corresponds to the intensity of the incident light. The image capturing unit 12 includes an analog front end (AFE) circuit that applies gain to the voltage that is converted by the imaging element. Furthermore, the image capturing unit 12 also includes an A/D conversion circuit that converts the voltage output from the AFE circuit, i.e., analog signals, into digital data. The digital data output from the A/D conversion circuit is output to the controller unit 13. Furthermore, the image capturing unit 12 corresponds to an "image input unit" in claims.

The controller unit 13 performs the overall control on the image processing device 10. The controller unit 13 receives the image data on captured images, which is digital data, from the image capturing unit 12. Then, the controller unit 13 performs operations to send the received image data to the image processing unit 18 so as to conduct image processing, store the received image data in the image memory 14, and output the received image data to an output device via the output unit 16. The controller unit 13 controls the lens 11 in accordance with the set AF function or in response to a command received by the operating unit 15 to switch the focal length of the lens, thereby performing the function or switching of the focal length.

The controller unit 13 includes a memory, which stores programs for performing the above-described control and the setting information on set values used by the programs, and a CPU executing the programs. The memory may store lens information that is set for the lens, such as the focal length of the lens, so as to perform the above-described AF function or switching of the focal length.

The operating unit 15 includes various buttons, such as the shutter button, and an operation panel. The operating unit 15 acquires the details of a user's operation to operate the image processing device 10 and transmits the details to the controller unit 13. For example, when a user presses the shutter button, the operating unit 15 sends, to the controller unit 13, a message that the shutter button has been pressed. In this case, the controller unit 13 gives a command to the image capturing unit 12 so as to capture the image of the object. In addition to the details of operations, the operating unit 15 also receives the information as to whether, for example, contrast correction processing, fog correction processing, and vibration control processing are to be performed as the processing details of enhancement processing by the user, and sends the received information to the controller unit 13.

The output unit 16 receives the image data stored in the image memory 14 via the controller unit 13 and outputs the image data to the output device. The output device may be any device that is capable of outputting image data, such as a printing device, fax machine, copier, electronic blackboard, projector, PC, tablet terminal, or smartphone. The output unit 16 and the output device may be connected via a cable, such as a High-Definition Multimedia Interface (HDMI) (registered trademark) cable, or may be connected via a network. Here, the network may be any network, such as a local area network (LAN), a wide area network (WAN), or the Internet. The network may be a wired or wireless network.

The transmission-rate measurement sensor 17 is a sensor that measures the light transmission rate, and may be used as one measuring unit. Here, as the transmission rate may be obtained from an image, the transmission-rate measurement sensor 17 may not be mounted in the image processing device 10. The transmission-rate measurement sensor 17 may measure the transmission rate by, for example, emitting infrared light and measuring the backscattering. Furthermore, a distance measuring sensor may be used as the transmission-rate measurement sensor 17 so that the distance from the image processing device 10 to the object is measured and the transmission rate is measured together with the image information. Alternatively, a laser beam with a specific wavelength may be emitted so that the transmission rate is calculated based on the reflectance of the laser beam. Still alternatively, images may be captured by multiple image taking devices at different angles so that the above-described distance is calculated based on the parallaxes of the captured images, and the transmission rate may be calculated based on the calculated distance. The transmission-rate measurement sensor 17 is controlled by the controller unit 13. As the transmission rate is measured by using the transmission-rate measurement sensor 17, it is possible to obtain the transmission rate with a high accuracy compared to a case where the transmission rate is obtained from an image.

The image processing unit 18 receives the image data, which is output from the image capturing unit 12 and is stored in the image memory 14, via the controller unit 13 and conducts image processing to obtain the output format that is requested by the output device. The image processing unit 18 also performs enhancement processing (contrast adjustment processing). As illustrated in FIG. 1, the image processing unit 18 may be configured as a device that is provided separately from the controller unit 13; however, the image processing unit 18 may be configured as a program for executing the image processing so as to be executed by the controller unit 13 or other circuits or devices. Meanwhile, if the controller unit 13 executes the program to conduct the above-described image processing, an image processing system may be provided instead of the image processing device 10.

Figure 2:
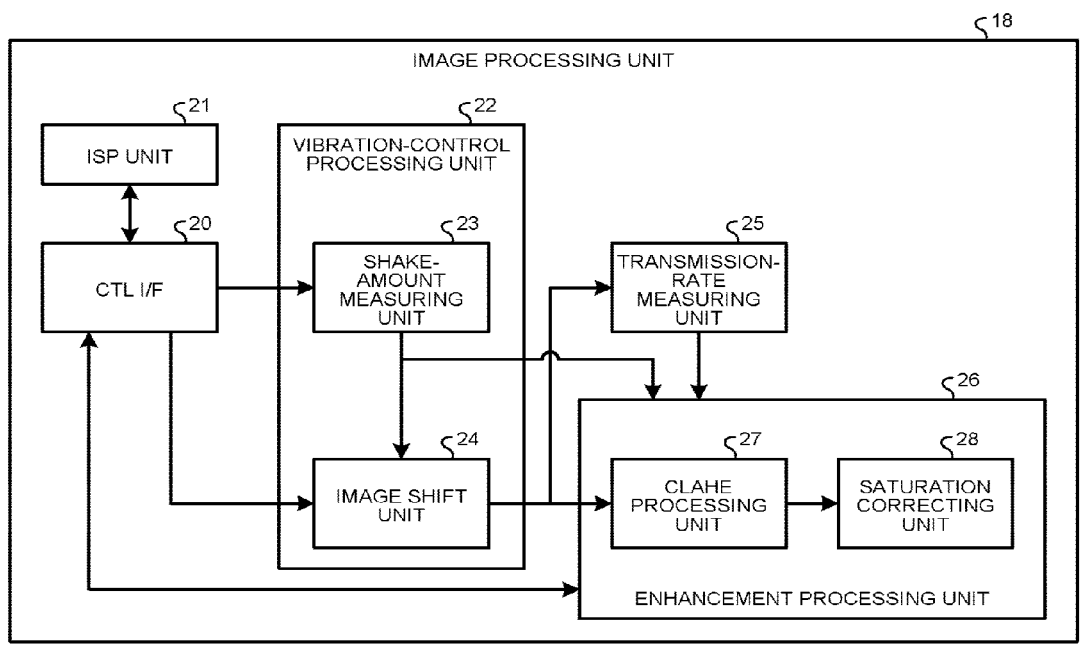
FIG. 2 is a block diagram that illustrates an example of the functional configuration of an image processing unit.

FIG. 2 is a block diagram that illustrates an example of the functional configuration of the image processing unit 18. Here, FIG. 2 is a diagram that illustrates an example of the configuration in a case where the transmission-rate measurement sensor 17 is not used in the configuration of FIG. 1. The image processing unit 18 includes a CTL I/F 20, an image signal processing (ISP) unit 21, a vibration-control processing unit 22, which is used as a shake-amount measuring unit and a shake correcting unit, a transmission-rate measuring unit 25, which is used as one measuring unit, and an enhancement processing unit 26.

In a case where an undepicted shake-amount measuring sensor is used as the shake-amount measuring unit, the amount of shake is measured by using a gyroscope, an acceleration sensor, or the like, in the case of, for example, optical vibration control or movable-sensor vibration control. For the optical vibration control or the movable-sensor vibration control, in order to correct the amount of shake that is measured by the sensor, a feedback control is performed by moving the lens 11 or the sensor by using a motor. In the present embodiment, an explanation is given of, as an example, an electronic vibration control system that uses the method of obtaining the amount of shake from an image by using the image processing unit 18; however, the example is not limited to this. Processing methods for optical vibration control and movable-sensor vibration control are also applicable.

Furthermore, if the transmission-rate measurement sensor 17 is used as a measuring unit, the transmission-rate measuring unit 25 is not necessary, and the transmission-rate measurement sensor 17 measures the transmission rate and acquires the transmission rate information. Then, the transmission-rate measurement sensor 17 provides the enhancement processing unit 26 with the acquired transmission rate information.

The image capturing unit 12 illustrated in FIG. 1 captures an image and outputs image data. The output image data is stored in the image memory 14 via the controller unit 13. The image data is transferred from the image memory 14 to the image processing unit 18 via the controller unit 13. The CTL I/F 20 is connected to the controller unit 13, receives the image data stored in the image memory 14 from the controller unit 13, and delivers the image data, on which image processing has been performed, to the controller unit 13.

The ISP unit 21 conducts image processing of typical cameras. Although this image processing is not explained in detail as it is well known, the image processing may include, for example, black correction, shading correction, gain processing, gamma processing, RGB conversion, filtering processing, or color correction processing. The ISP unit 21 causes the image memory 14 to temporarily store the image data, on which image processing has been conducted, via the CTL I/F 20.

The vibration-control processing unit 22 includes a shake-amount measuring unit 23 and an image shift unit 24. The shake-amount measuring unit 23 measures, in each cycle in which an image is input, the amount of shake of the image. The shake-amount measuring unit 23 measures the amount of shake only when receiving the vibration control ON information from the controller unit 13, and outputs the measurement result to the image shift unit 24 and the enhancement processing unit 26 that are described later. When receiving the vibration control OFF information from the controller unit 13, the shake-amount measuring unit 23 does not measure the amount of shake but outputs the information indicating that the amount of shake is zero, to the image shift unit 24 and the enhancement processing unit 26. Although the method of measuring the amount of shake is not explained in detail as it is well known, the method may include, for example, the method using pattern matching or the method using a phase correlation technique. Furthermore, depending on the required accuracy, the amount of shake may be measured after the size of an image is reduced so as to reduce the loads for the amount of calculation. The shake-amount measuring unit 23 corresponds to a "shake-amount measuring unit" in claims.

The image shift unit 24 corrects the shake of an input image based on the amount of shake that is measured by the shake-amount measuring unit 23. The image shift unit 24 conducts shifting, corresponding to the amount of shake that is measured by the shake-amount measuring unit 23, and reads the image data that is processed by the ISP unit 21 and is stored in the image memory 14. If the image data is read with a shift that corresponds to the amount of shake, there is an area, such as a gray area illustrated in FIGS. 6 to 8 as described later, where an image is not present; however, image data in the grey area is embedded with 0 and the read image data is output to the enhancement processing unit 26 and the transmission-rate measuring unit 25 at subsequent stages. Moreover, the image shift unit 24 corresponds to a "shake correcting unit" in claims.

Here, a brief explanation is given of vibration control processing that is performed by the vibration-control processing unit 22. FIGS. 3 to 8 are diagrams that illustrate an example of the vibration control processing. Here, the blocks are divided into 4×4=16 vertically and horizontally as illustrated in FIGS. 4 to 8 and represent areas for CLAHE processing. Hereafter, the divided blocks are sometimes referred to as "area or tile".

Figure 3:
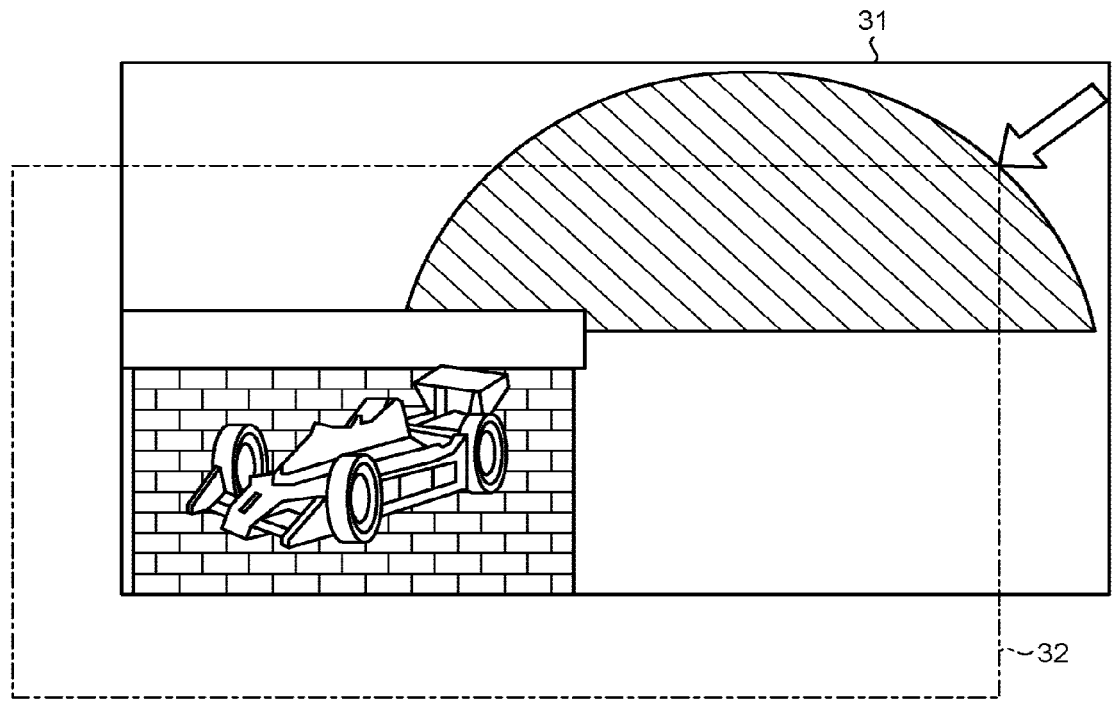
FIG. 3 is a diagram that illustrates an example of vibration control processing.
Figure 4:
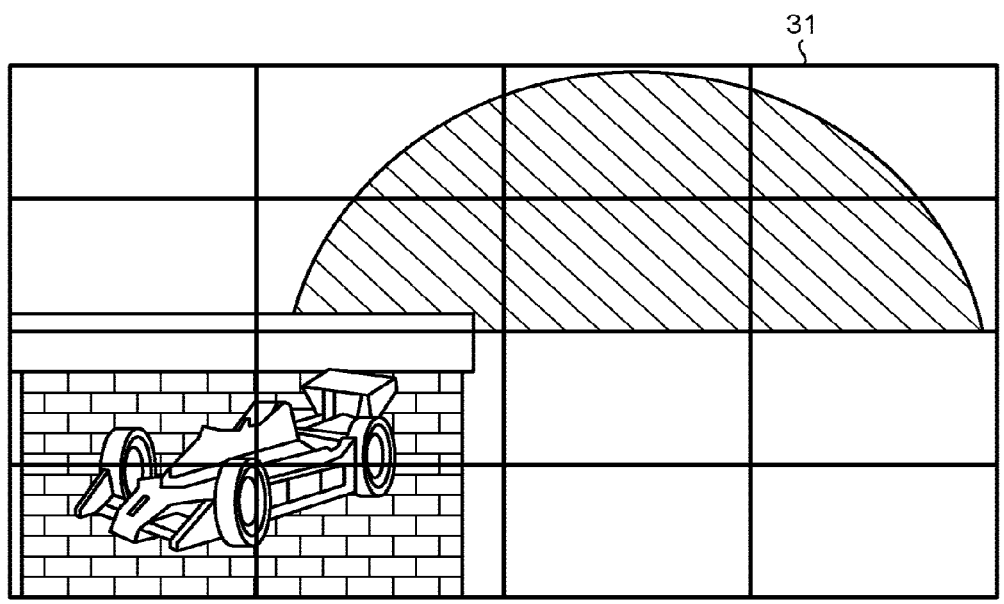
FIG. 4 is a diagram that illustrates an example of vibration control processing.
Figure 5:
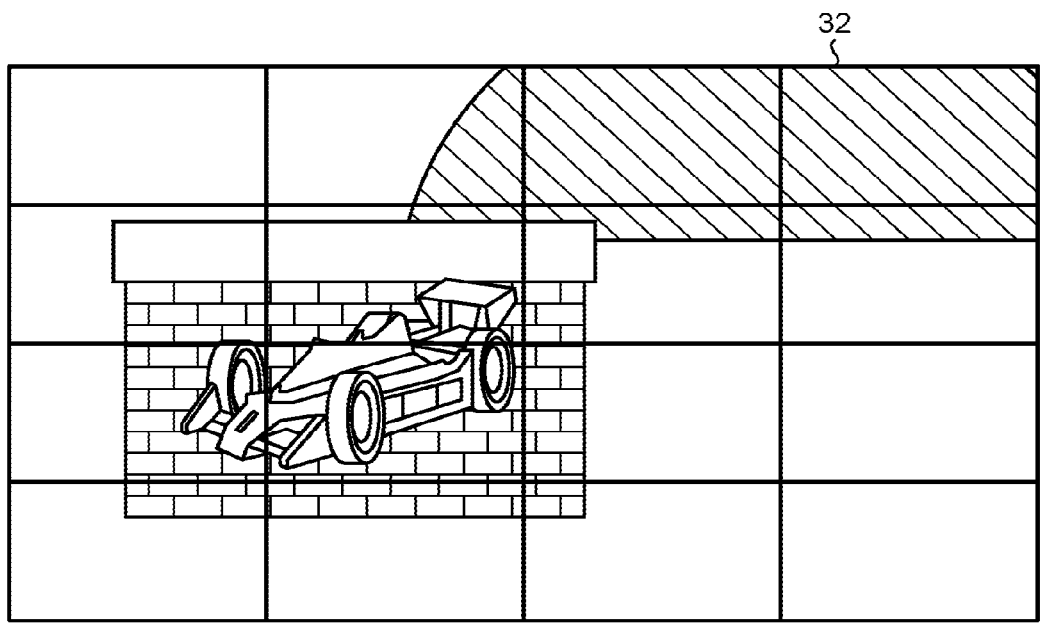
FIG. 5 is a diagram that illustrates an example of vibration control processing.
Figure 6:
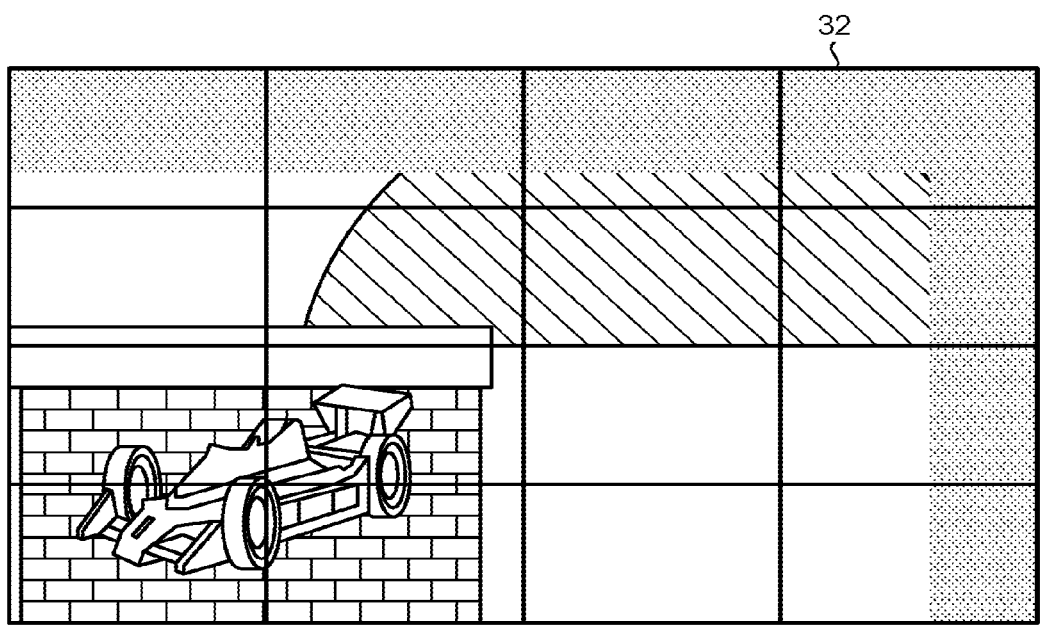
FIG. 6 is a diagram that illustrates an example of vibration control processing.

An explanation is given of a case where, as illustrated in FIG. 3, the image processing device 10 is shook from an N−1-th frame (a square by a solid line) 31 to an N-th frame (a square by a dashed-dotted line) 32 in the direction of the arrow. If vibration control processing is not performed on the N−1-th frame 31 illustrated in FIG. 4, the image of the N-th frame 32 is obtained as illustrated in FIG. 5. In contrast, if vibration control processing is performed, the image of the N-th frame 32 is obtained as illustrated in FIG. 6. In the example of FIG. 6, the blocks each including a gray area are targets on which the vibration control processing is performed.

If the vibration control processing is not performed, there is a large difference in the histogram of each of the divided blocks between the N−1-th frame (hereafter, referred to as the "N−1 frame") 31 and the N-th frame (hereafter, referred to as the "N frame") 32 and therefore there is a difference in the look-up tables (hereafter, referred to as the "LUTs") of all the blocks between the N−1 frame 31 and the N frame 32. Thus, there is a possibility that the brightness of the entire image is changed.

Conversely, if the vibration control processing is performed, the LUTs of the blocks, except for the blocks on the top transverse row and the blocks on the rightmost vertical column, are not changed as illustrated in FIG. 6. However, there are a few numbers of valid pixels in the blocks on the top transverse row and in the blocks on the rightmost vertical column. Therefore, if the amount of shake is large and the number of valid pixels is smaller than a predetermined number, the brightness (contrast) are different between the N−1 frame 31 and the N frame 32.

Figure 7:
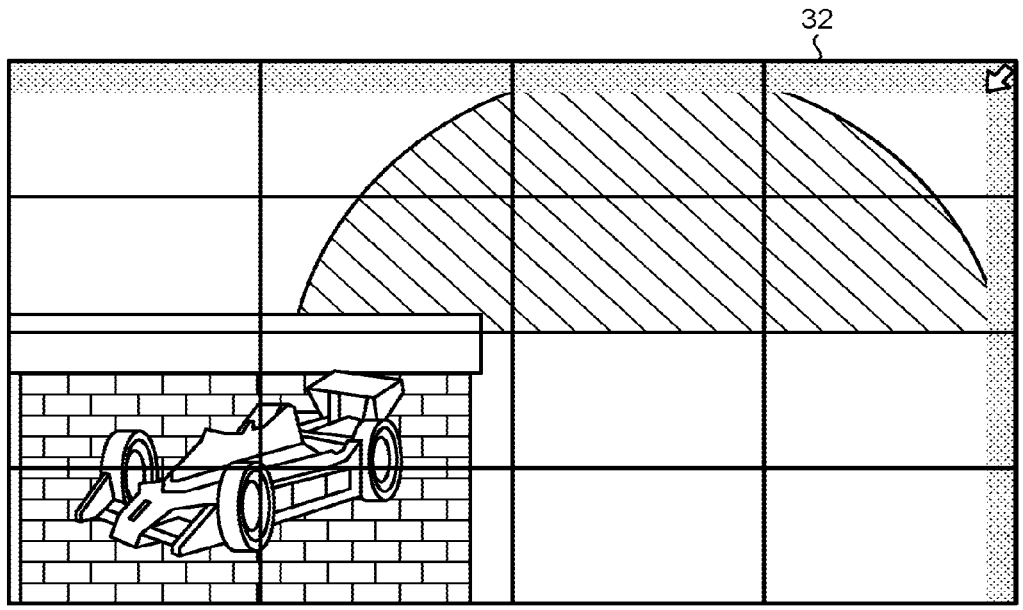
FIG. 7 is a diagram that illustrates an example of vibration control processing.
Figure 8:
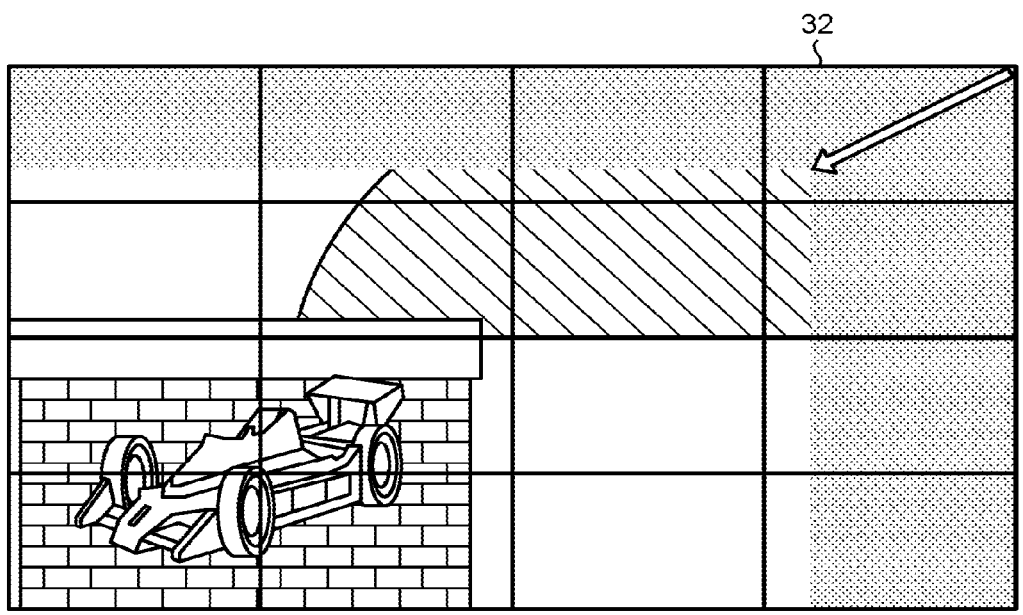
FIG. 8 is a diagram that illustrates an example of vibration control processing.

Specifically, with regard to the blocks on the top transverse row and the blocks on the rightmost vertical column, if the amount of shake is small as indicated by the arrow illustrated in FIG. 7, the number of valid pixels is large and the number of invalid pixels (gray area) is small. In contrast, if the amount of shake is large as indicated by the arrow illustrated in FIG. 8, the number of valid pixels is small and the number of invalid pixels (gray area) is large. As in the example of FIG. 8, as the number of valid pixels is smaller, the difference in the forms of the histograms, which indicate the feature values of the images, of the same blocks between the N−1 frame 31 and the N frame 32 is larger. Therefore, according to the present embodiment, the processing details of enhancement processing for blocks in the peripheral section of the image is changed in accordance with the amount of shake, thereby preventing the forms of the histograms of the same blocks between the N−1 frame 31 and the N frame 32 from being largely different. The specific details of the enhancement processing are described later.

Figure 9:
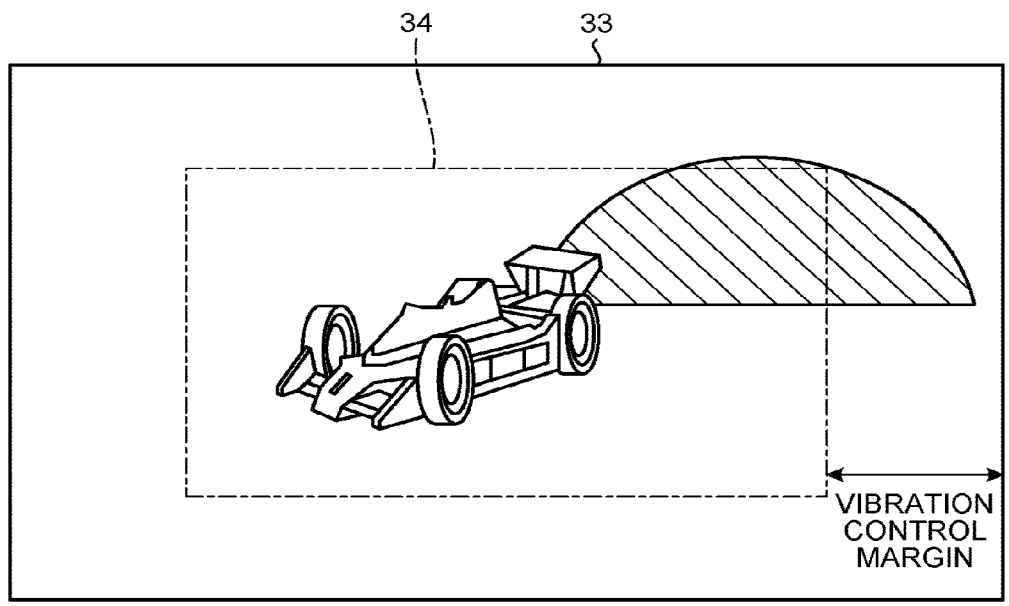
FIG. 9 is a diagram that illustrates an example of the other vibration control processing.
Figure 10:
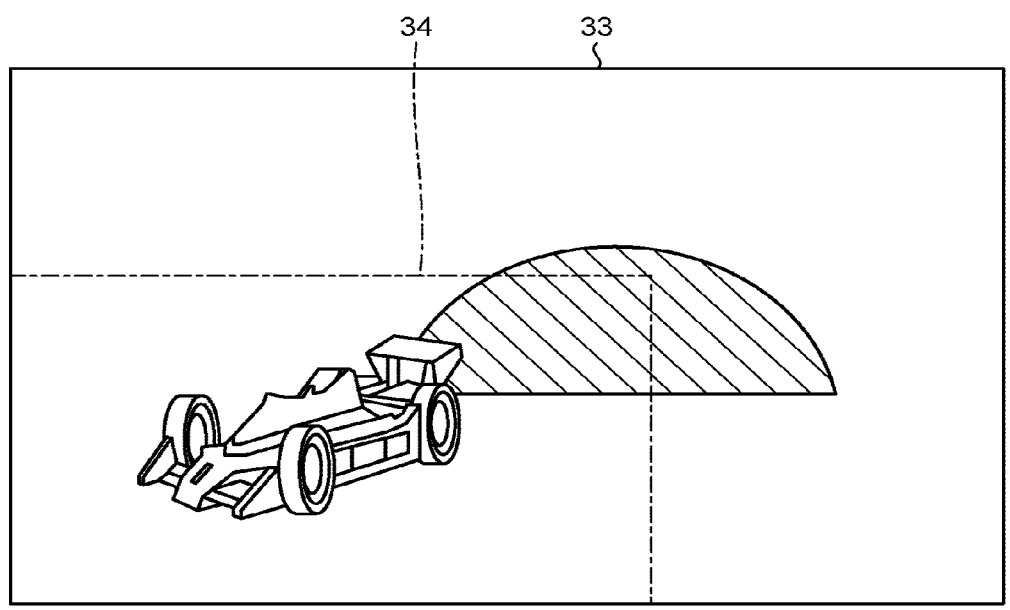
FIG. 10 is a diagram that illustrates an example of the other vibration control processing.
Figure 11:
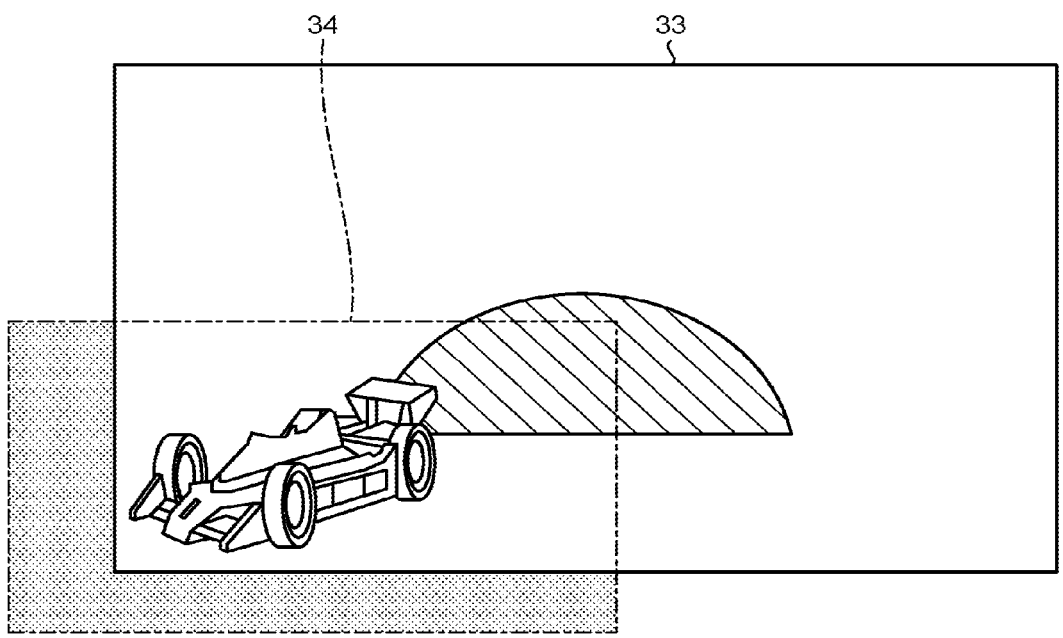
FIG. 11 is a diagram that illustrates an example of the other vibration control processing.

Next, an explanation is given of other vibration control processing with reference to FIGS. 9 to 11. FIGS. 9 to 11 are diagrams that illustrate an example of the other vibration control processing. As illustrated in FIG. 9, the other vibration control processing uses the method of clipping (trimming) and outputting a partial image area 34 instead of outputting an entire image area 33 that is captured by the sensor of the image capturing unit 12. A vibration control margin illustrated in FIG. 9 represents the number (width) of excess pixels that are not to be output within the capturing range of the sensor of the image capturing unit 12. In the case of the vibration control processing, as illustrated in FIG. 10, if the amount of shake is such that the output image area 34, which is included in the entire image area 33 within the capturing range, falls within the capturing range of the sensor of the image capturing unit 12, the number of valid pixels is not decreased. Conversely, as illustrated in FIG. 11, if the amount of shake is such that the output image area 34 does not fall within the capturing range of the sensor of the image capturing unit 12 (it is equal to or more than the vibration control margin), the number of valid pixels is decreased and there are the number of invalid pixels (gray area), as explained with reference to FIGS. 3 to 8. In such a case, too, the enhancement processing according to the present embodiment is applicable.

Explanations continue with reference back to FIG. 2. The transmission-rate measuring unit 25 conducts image processing on the image data received from the image shift unit 24, and calculates the transmission rate. The details of the method of calculating the transmission rate are explained later. The transmission-rate measuring unit 25 outputs the calculated transmission rate as transmission rate information to the enhancement processing unit 26. Furthermore, as the transmission rate information, the transmission-rate measuring unit 25 measures or calculates, from an image, the light transmission rate of each area divided by a dividing unit or the data correlated with the light transmission rate.

The enhancement processing unit 26 performs enhancement processing to divide the image data, on which vibration control processing has been performed, into each area and to equalize the histogram indicating the feature value of the image in each of the divided areas. Specifically, with regard to the image data that is received from the image shift unit 24, the enhancement processing unit 26 uses the transmission rate information received from the transmission-rate measuring unit 25, to conduct CLAHE on a brightness component and conduct saturation correction processing on a color component. Therefore, the enhancement processing unit 26 includes a CLAHE processing unit 27 that conducts CLAHE, and a saturation correcting unit 28 that performs saturation correction. After these processes are completed, the enhancement processing unit 26 stores the image data, on which the image processing has been performed, in the image memory 14 via the CTL I/F 20. The output device requests the image data from the controller unit 13 via the output unit 16, and the controller unit 13 outputs the image data stored in the image memory 14 to the output device via the output unit 16. Furthermore, with regard to the image data, the enhancement processing unit 26 may conduct CLAHE on a brightness component and conduct saturation correction processing on a color component without using the transmission rate information. Moreover, the enhancement processing unit 26 functions as a "dividing unit", a "feature-value calculating unit", an "enhancement processing unit", a "conversion-table calculating unit", a "pixel-number calculating unit", a "combining unit", and a "label-information applying unit" in claims.

The enhancement processing unit (the dividing unit) 26 divides the image, which has been corrected by the image shift unit 24, into multiple areas in accordance with a specified division condition. Furthermore, the enhancement processing unit (the feature-value calculating unit) 26 calculates the histogram indicating the feature value of an image with regard to each of the areas that are divided by the dividing unit. Furthermore, the enhancement processing unit (the enhancement processing unit) 26 determines the processing details of the enhancement processing to equalize the histogram of each area in accordance with the amount of shake of the image, measured by the shake-amount measuring unit, and conducts enhancement processing on each area based on the histogram that is calculated for each area. Furthermore, the enhancement processing unit (the pixel-number calculating unit) 26 calculates the number of valid pixels with regard to each of the areas that are divided by the dividing unit. Furthermore, the enhancement processing unit (the combining unit) 26 combines a first area, of which the number of valid pixels is equal to or less than a predetermined threshold, and a second area, which is the neighboring area and of which the number of valid pixels is equal to or more than the predetermined threshold, thereby obtaining a third area. Furthermore, the enhancement processing unit (the label-information applying unit) 26 applies the label information that indicates the type of object within the image.

The enhancement processing unit 26 may also receive image data directly from the CTL I/F 20 and conduct enhancement processing on the image data as well as the image data on which image processing has been performed by the ISP unit 21. Furthermore, the enhancement processing unit 26 may perform only either one of the CLAHE and the saturation correction instead of performing the both.

Figure 12:
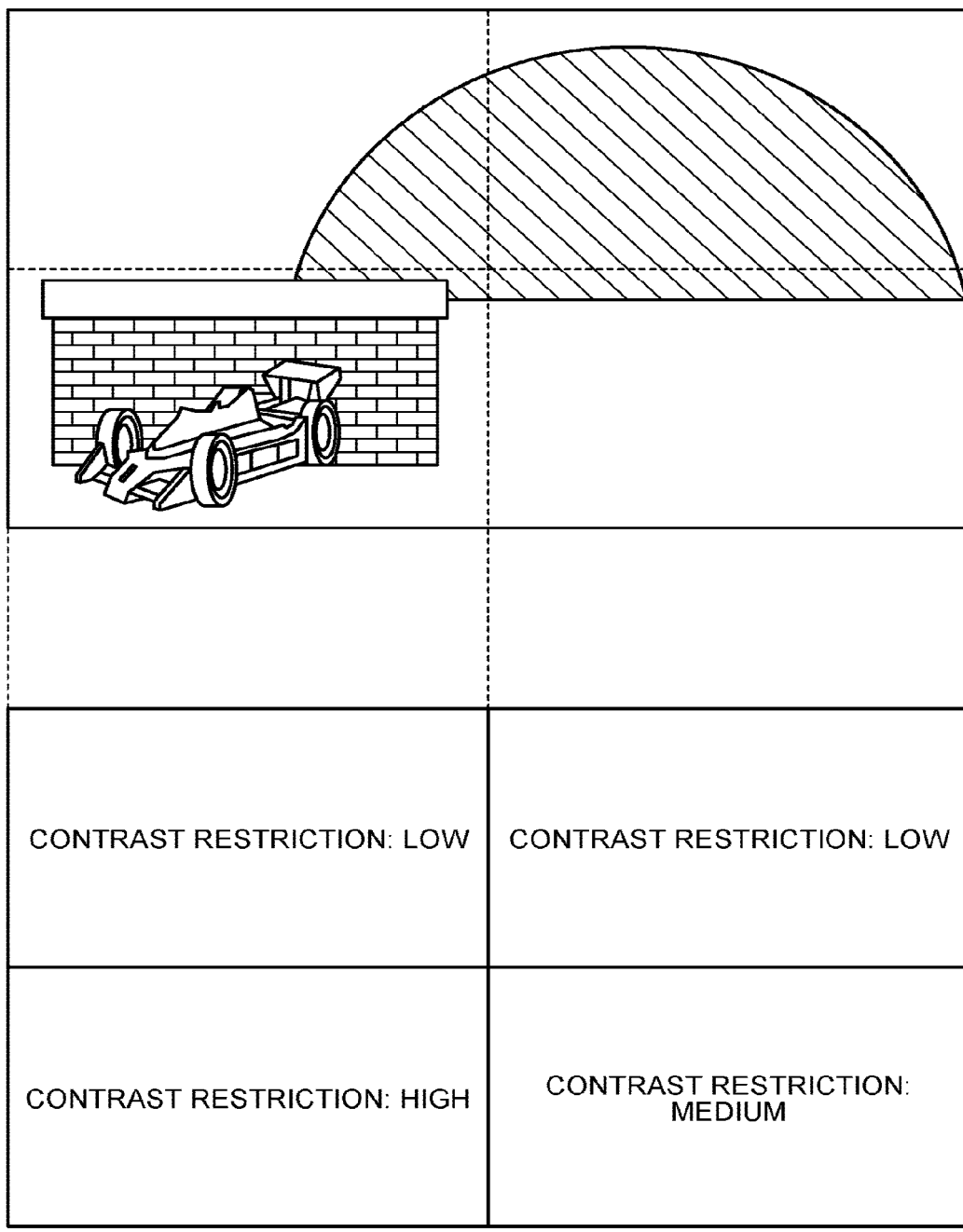
FIG. 12 is a diagram that illustrates the outline of image contrast adjustment.

Here, a brief explanation is given of the CLAHE that is conducted by the CLAHE processing unit 27. FIG. 12 is a diagram that illustrates CLAHE processing. The CLAHE processing is processing to divide a captured image into multiple rectangular areas (tiles) as illustrated in FIG. 12, and conduct equalization on the histogram with regard to each tile, thereby improving the contrast. FIG. 12 illustrates an example of the image that is captured in an area where fog occurs, for example. In this area, the density of fog is uniform, and the light transmission rate varies in accordance with the distance from the image processing device 10. An explanation is given below by using fog as an example; however, the example is not limited to fog. For example, mist, yellow sand, and PM2.5 described above may also be applicable.

Among the tiles that are evenly divided into four in the vertical and horizontal of FIG. 12, the light transmission rate of the upper 2 tiles is low as a mountain at a long distance is captured, and the light transmission rate of the lower left tile is high as a vehicle at a short distance is captured. Furthermore, the light transmission rate of the lower right tile has the intermediate value as an object at an intermediate distance between the mountain and the vehicle is captured.

In the fog image that is captured in the fog, with regard to the tile that has a low light transmission rate, i.e., the tile in which the distance to the capturing target is long and the dense fog is captured, the contrast is low, and the capturing target is not clear. Therefore, the restriction value of the contrast is set to be small so that contrast enhancement processing is conducted to a large degree. Conversely, with regard to the tile that has a high light transmission rate, i.e., the tile in which the distance to the capturing target is short and the light fog is captured, the restriction value of the contrast is set to be large so that contrast enhancement processing is less performed. With regard to the tile that has the intermediate light transmission rate, the intermediate restriction value is set so that the appropriate contrast enhancement processing is performed. Thus, the unclear capturing target is made so as to be clearly viewed, and the clear capturing target is prevented from being excessively corrected, whereby it is possible to make noise unnoticeable.

If the density of fog is uniform, contrast enhancement processing may be performed by changing the restriction value of the contrast in accordance with the distance to the capturing target, as described above. If the density of fog is not uniform, the light transmission rate does not depend on the distance; therefore, contrast enhancement processing may be performed by changing the restriction value of the contrast in accordance with the measured transmission rate or the calculated transmission rate.

The number of divisions of the image into tiles during the CLAHE is not limited to four as illustrated in FIG. 12, and the image may be more finely divided into, for example, 9, 16, or 25. Furthermore, the number of divisions is previously specified by a division condition. For the histogram equalizing processing, performed during the CLAHE, known methods may be used, for example, the method that is disclosed in Japanese Unexamined Patent Application Publication No. 2006-195651. Japanese Unexamined Patent Application Publication No. 2006-195651, or the like, may be referred to for the details. As the enhancement processing unit 26 conducts the above-described tile division and thus also functions as the dividing unit, which divides an image into multiple areas, as well as the enhancement processing unit that conducts enhancement processing.

The histogram equalizing processing is the processing to enhance the contrast to a large degree; therefore, in order to reduce the contrast, a parameter called a clip value, indicating a restriction value of the contrast, is introduced, and clipping operation of a histogram is performed.

The clipping operation is an operation that is used in a local histogram equalization technique. The local histogram equalization technique is a typical contrast enhancement technique, and it is a technique that implements contrast enhancement processing in consideration of the local information on an image. With reference to FIGS. 13A to 13C, the clipping operation is explained. If the distribution of the brightness values of pixels within an area (tile) of the input image illustrated in FIG. 13A is represented by using the distribution chart, it is obtained as in FIG. 13B.

If a predetermined clip value is set for a tile and the number of pixels of each brightness value exceeds the clip value, the number of exceeding pixels is removed, as indicated by diagonal lines in FIG. 13B. The numbers of exceeding pixels are added up, and the resultant value is divided by the total number of brightness values, so that the number of pixels, which is to be allocated to each brightness value, is calculated. Then, the number of pixels of each brightness value, from which the number of pixels exceeding the clip value has been removed, is added to the number of pixels that is allocated to each brightness value, whereby the new number of pixels in each brightness value is calculated, illustrated in FIG. 13C. For example, if the total number of pixels in the area indicated by the diagonal lines in FIG. 13B is 512 and the total number of brightness values is 256 for 256 tones, the number of pixels of 512/256=2 is allocated to every brightness value and is added. In clipping operation, the distribution of the number of pixels of each brightness value calculated as described above is reset.

Figure 14A:
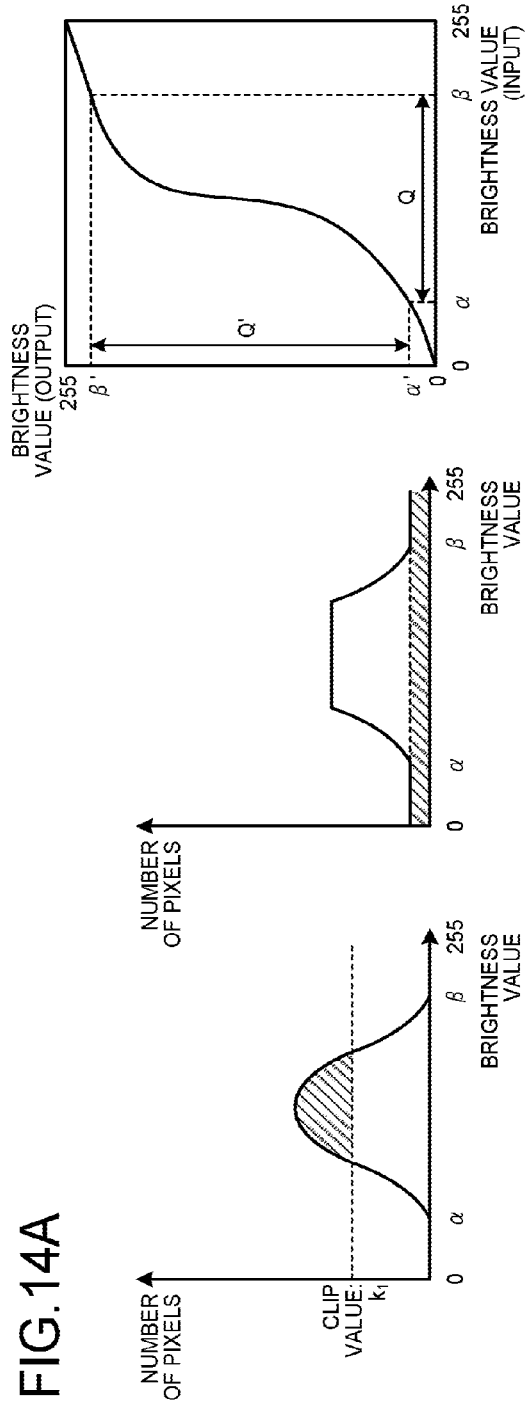
FIGS. 14A and 14B are diagrams that illustrate the effect of setting the clip value.
Figure 14B:
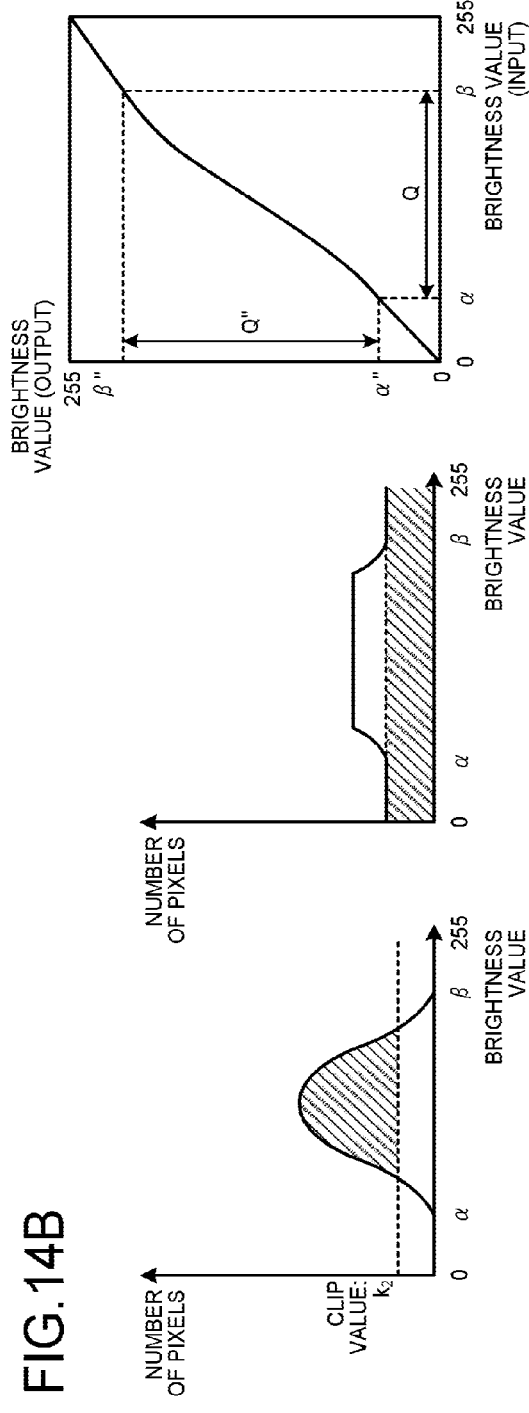

Next, with reference to FIGS. 14A and 14B, an explanation is given of the effect of setting the clip value. With reference to FIGS. 14A and 14B, in the distribution charts each illustrated on the left side, where the number of pixels exceeding the clip value has not been removed yet, the brightness values of a certain divided tile distribute from $\alpha$ to $\beta$. The number of pixels exceeding the clip value $k_1$ in FIG. 14A and the clip value $k_2$ in FIG. 14B ($k_2<k_1$) are removed, the numbers of exceeding pixels are added up, the resultant value is divided by the total number of brightness values so as to calculate the number of pixels to be allocated to each brightness value, and the number of pixels is added to every brightness value. Thus, it is possible to obtain the distribution chart after clipping each illustrated in the middle. By referring to the distribution chart after clipping, the number of pixels of each brightness value, i.e., from the brightness value 0 to 255, is added up, accumulated, and then normalized, whereby the transformation curve indicating the converted brightness value with respect to each brightness value is obtained as illustrated on the right side. Here, the normalization is a process for fitting within the values 0 to 255.

In order to obtain the transformation curve, the number of pixels of each brightness value may be added and calculated each time, or it may be selected from a look-up table (LUT) each time stored in a memory, in which the number of pixels of each brightness value is previously added and calculated.

With reference to FIGS. 15A and 15B, a more detailed explanation is given of the method of obtaining the transformation curve from the distribution chart after clipping. FIG. 15A illustrates the distribution chart after clipping, and FIG. 15B is a graph that illustrates the transformation curve that is obtained from FIG. 15A. As illustrated in FIG. 15A, the number of pixels is the same from the brightness value 0 to $\alpha$. The converted brightness value from the brightness value 0 to $\alpha$ is obtained by adding and accumulating the same number of pixels to the pre-conversion brightness value; therefore, the transformation curve between the brightness values 0 and $\alpha$ has the constant slope as illustrated in FIG. 15B. Furthermore, the transformation curve also has the constant slope as it is obtained by adding and accumulating the same number of pixels in the same manner between the brightness values $\gamma$ and $\delta$ and between the brightness values $\beta$ and 255.

Furthermore, the transformation curve between the brightness values $\gamma$ and $\delta$ has a steeper slope than that between the brightness values 0 and $\alpha$ and between $\beta$ and 255, as there is a larger number of pixels to be added. The number of pixels is not the same between the brightness values $\alpha$ and $\gamma$ as illustrated in FIG. 15A; therefore, the transformation curve exhibits a tendency to rapidly increase. Thus, the transformation curve from the brightness values $\alpha$ to $\gamma$ obtained by adding and accumulating the number of pixels is not a straight line but become a rapidly increasing curve as illustrated in FIG. 15B. Conversely, the number of pixels exhibits a tendency to rapidly decrease between the brightness values $\delta$ and $\beta$; therefore, the transformation curve between brightness values $\delta$ and $\beta$ become a rapidly decreasing curve. By combining these straight lines and curves, the transformation curve may be obtained as illustrated in FIG. 15B.

In this manner, each transformation curve can also be obtained from the distribution charts after clipping illustrated in FIGS. 14A and 14B. In the example illustrated in FIG. 14A where the set clip value is large, the relations of $\alpha>\alpha'$ and $\beta<\beta'$ hold in the transformation curve, and the relation of $Q<Q'$ holds between the distance Q from $\alpha$ to $\beta$ and the distance $Q'$ from $\alpha'$ to $\beta'$. This indicates that a indicating the lower limit value of the brightness value is decreased to $\alpha'$, $\beta$ indicating the upper limit value of the brightness value is increased to $\beta'$, and the distribution of pixels is enlarged. That is, this indicates that the gradation after conversion becomes larger compared to the gradation of the original image so that the area where the brightness values have been similar and thus have been hardly distinguishable is made clearly distinguishable.

In the example illustrated in FIG. 14B where the set clip value is small, the relations of $\alpha>\alpha''$, $\beta<\beta''$, and $Q<Q''$ hold in the transformation curve as is the case with the example illustrated in FIG. 14A; however, their respective values are close to each other. Therefore, although the lower limit value is decreased from $\alpha$ to $\alpha''$ and the upper limit value is increased from $\beta$ to $\beta''$, they are slight increase and decrease, and there is a little difference compared to the pre-conversion. That is, this indicates that there is little change in the gradation after conversion compared to the gradation of the original image and the gradation correction is little done.

In the middle of the calculation or after the calculation of obtaining the above-described transformation curve, $\alpha'$ may be converted such that $\alpha'=a$ holds and accordingly $\beta'$ and the transformation curve may be calculated again. The same process may be performed on not only $\alpha'$ but also $\beta'$, $\alpha''$, or $\beta''$.

According to the above-described result, it is understood that, with regard to fog images, a small clip value may be set for the area where the light transmission rate is high so that the degree of adjustment for the contrast is small, and a large clip value may be set for the area where the light transmission rate is low so that the degree of adjustment for the contrast is large.

Although the light transmission rate may be measured by using the transmission-rate measurement sensor 17, the transmission rate may also be calculated from an image during image processing. As one of the methods of calculating the light transmission rate, an explanation is given of the method that uses a dark channel. For example, "Single Image Haze Removal Using Dark Channel Prior", Kaiming He, Jian Sun, Xiaoou Tang, Pattern Analysis and Machine Intelligence, IEEE 2011 or Japanese Unexamined Patent Application Publication No. 2012-221237 may be referred to for the details of the method.

By calculating the minimum values of RGB in a local area of a fog image due to the characteristics of fog, the data that is correlated with the approximate transmission rate of the fog may be obtained. This data is called the dark channel. The fog model equation may be represented by using the following Equation (1) where the image data in a case where the fog is cleared is J, the transmission rate in the air is t (t=0 to 1), the airglow (indirect optic component) is A, and the image data when fog occurs is I.

$$I = J \times t + (1-t) \times A \quad (1)$$

In Equation (1), J×t is called direct optical data and represents the state where the image with the light transmission rate of 100%, where the fog is cleared, is attenuated by the transmission rate t. In Equation (1), (1−t)×A is called indirect optical data (or air light component) and represents the state where the brightness increases due to the airglow A corresponding to the attenuation by direct light.

The dark channel is provided due to the characteristics such that, if the fog is cleared, the RGB minimum values of most of the matters are nearly zero. According to Equation (1), as the transmission rate t is lower, the airglow component is added so that the value becomes larger. Conversely, the direct optical data has the value that is near zero. Therefore, it is assumed that the direct optical data is 0, and the approximate transmission rate t may be obtained by using the value of the airglow A.

In order to set the minimum value of J to a value that is closer to zero, a local area may be divided into areas with a smaller size, for example, 15×15, and the minimum value of each of the areas may be obtained. Furthermore, even if the fog is cleared or not, the minimum values of RGB of a white large object indicates the value that is nearly zero; therefore, even with the dark channel, it is difficult to calculate the accurate transmission rate.

Under the above-described condition, the relation equation of the transmission rate t and the dark channel calculated from the model equation that is represented by Equation (1) is represented by the following Equation (2). In Equation (2), Ω denotes a local area with regard to the pixel of interest, and $\min_c$ represents the RGB minimum values.

$$t = 1 - \min_{y \in \Omega}\left(\min_c\left(\frac{J}{A}\right)\right) \quad (2)$$

By using Equation (2), either the transmission rate t or the dark channel $\min_{y \in \Omega}(\min_c(J))$ is calculated. Hereafter, the dark channel is described as dark(J). The transmission-rate measuring unit 25 illustrated in FIG. 2 uses Equation (2) to calculate the transmission rate t or the dark channel dark(J) and outputs it as the transmission rate information to the enhancement processing unit 26. The enhancement processing unit 26 determines the clip value k to be used for CLAHE in accordance with the transmission rate t or the dark channel dark(J).

Conventionally, the clip value k for CLAHE, which does not use the above-described transmission rate information, is determined by a user using the following Equation (3) and the following Equation (4) and is set by the user.

$$k\_min = \frac{m}{N} \quad (3)$$

$$k = k\_min + (m - k\_min) \times S \quad (4)$$

In Equation (3), m is the number of pixels per tile, N is the number of bins for the pixels, i.e., 256 in the case of 8-bit image and 65536 in the case of 16-bit image. k_min is the minimum clip value. In Equation (4), the user's set value S is a value between 0 and 1 and, if it is 1, a state is almost such that there is no restriction by the clip value.

The clip value k for CLAHE using the transmission rate information may be calculated by using the following Equation (5) or the following Equation (6), which is obtained by modifying Equation (4) where the average value of the transmission rate t per tile is the tile transmission rate T, and the average value of the dark channel dark(J) per tile is the tile dark channel dark(J).

$$k=k\_min+(m-k\_min) \times S \times \{(1-T) \times \alpha 1+\beta 1\} \quad (5)$$

or $$k=k\_min+(m-k\_min) \times S \times \{dark(J) \times \alpha 2+\beta 2\} \quad (6)$$

By using Equation (5) or Equation (6), the clip value for CLAHE may be changed for each tile transmission rate so that a large clip value is set for a tile with a low transmission rate and a small clip value is set for a tile with a high transmission rate. In Equation (5) and Equation (6), α1, β1, α2, and β2 are the values that conduct linear transformation on the transmission rate t and that indicates how much weight is to be applied and, if the result of the linear transformation exceeds 1, it is clipped. For example, α1, α2, β1, and β2 may be defined such that the maximum value of the tile dark channel in the entire image is 1 and the minimum value of the tile dark channel is 0 if the sensitivity for the transmission rate is high and a change in the clip value is large even with a small difference in the transmission rate.

The clip value k for CLAHE using the transmission rate information and the percentage of the number of valid pixels may be calculated by using the following Equation (7) that is obtained by modifying Equation (4).

$$k = k\_min + (m - k\_min) \times S \times \{dark(J) \times \alpha 2 + \beta 2\} \times B \times \frac{M}{m} \quad (7)$$

In Equation (7), B is an adjustment parameter, and M is the number of valid pixels of one tile (area). The other symbols are the same as those in Equation (6).

By using Equation (7), as the number of valid pixels per tile (area) is larger, the clip value is larger and, as the number of valid pixels is smaller, the clip value is smaller. Therefore, if the number of valid pixels is small and a parameter is easily changed in the N−1 frame and the N frame, the enhancement intensity is decreased. Equation (7) describes only the dark channel but may also describe in the same way the case of the transmission rate. Furthermore, in Equation (7), the tile dark channel or the tile transmission rate is the average value of pixels per tile (area), and the invalid pixels are removed from the targets for calculation. In this way, the enhancement processing unit 26 sets a low enhancement intensity for the enhancement processing that is performed on an area in the peripheral section of the image among multiple areas if the amount of shake of the image is large, and sets a high enhancement intensity for the enhancement processing that is performed on an area in the peripheral section of the image if the amount of shake of the image is small. That is, the enhancement processing unit 26 sets a small clip value indicating the restriction value of the contrast which is used for conducting equalizing processing on each histogram, calculated for each area if the amount of shake of the image is large, and sets a large clip value indicating the restriction value of the contrast if the amount of shake of the image is small.

The enhancement processing unit 26 calculates the clip value for each tile by using Equation (5), Equation (6), or Equation (7), and conducts CLAHE processing by using each clip value. Instead of calculating the clip value by using Equation (5), Equation (6) or Equation (7), the clip value may be set in advance in a table in relation to the transmission rate information, and may be determined by referring to the table. When the CLAHE processing is conducted, if an image is an RGB image, the RGB color space may be converted into YCbCr color space, or the like. The color space conversion may be conducted by using any conventionally-known calculation equation. The enhancement processing unit 26 may use the converted Y (brightness value) so as to conduct equalization on the histogram according to the above-described method.

The enhancement processing unit 26 may perform only CLAHE processing; however, by only this processing, the fog Image becomes almost achromatic, and the saturation is sometimes insufficient. In such a case, gain may be applied to the Cb, Cr components in the YCbCr color space so that the saturation is improved. Cb is a color difference component that represents the hue and the saturation of blue-based color, and Cr is a color difference component that represents the hue and the saturation of red-based color.

If the transmission rate information is used, the saturation correction by applying gain to the Cb, Cr components may be conducted by using the following Equations (8) and Equation (9) or the following Equations (10) and Equation (11). In the following Equations (8) to (11), Cb and Cr have a value between −1 and 1. Furthermore, in the following Equations (8) to (11), x of Cx represents either b or r. Furthermore, Cx' is the value of Cb, Cr after the saturation is corrected.

$$0 > Cx$$

$$Cx' = -+\{(Cx+1)\}/\wedge(1+[S\times\{(1-T)\times\alpha 3+\beta 3\}]) \quad (8)$$

$$0 \leq Cx$$

$$Cx' = 1-\{(1-Cx)\}/\wedge(1+[S\times\{(1-T)\times\alpha 3+\beta 3\}]) \quad (9)$$

or $$0 \geq Cx$$

$$Cx' = -1+\{(Cx+1)\}/\wedge[1+\{S\times(\mathrm{dark}(J)\times\alpha 4+\beta 4)\}] \quad (10)$$

$$0 \leq Cx$$

$$Cx' = 1-\{(1-Cx)\}/\wedge[1+\{S\times(\mathrm{dark}(J)\times\alpha 4+\beta 4)\}] \quad (11)$$

Equations (8) to (11) are also the equations such that, as the transmission rate is higher, the gain is smaller and, as the transmission rate is lower, the gain is larger, as is the case with the clip value for CLAHE. Furthermore, as is the case with the clip value for CLAHE, α3, α4, β3, and β4 are the values that conducts linear transformation on the transmission rate t and that indicates how much weight is to be applied.

If the percentage of the number of valid pixels is used without using the transmission rate information, the saturation correction by applying gain to the Cb, Cr components may be conducted by using the following Equation (12) and the following Equation (13).

$$0 > Cx \quad (12)$$

$$Cx' = -1+\{(Cx+1)\}\left[1+\{S\times(\mathrm{dark}(J)\times\alpha 4+\beta 4)\}\times D\times\frac{M}{m}\right]$$

$$0 \leq Cx \quad (13)$$

$$Cx' = 1-\{(1-Cx)\}\left[1+\{S\times(\mathrm{dark}(J)\times\alpha 4+\beta 4)\}\times D\times\frac{M}{m}\right]$$

In Equations (12) and (13), D is an adjustment parameter, and M is the number of valid pixels of one tile (area). The other symbols are the same as those in Equations (10) and (11). Here, dark(J) may be linearly transformed.

In Equations (12) and (13), as is the case with the clip value for CLAHE, as the number of valid pixels is larger, the gain is larger and, as the number of valid pixels is smaller, the gain is smaller. Furthermore, the "tile (area)", used in Equation is the same tile (area) as that in CLAHE.

Figure 16A:
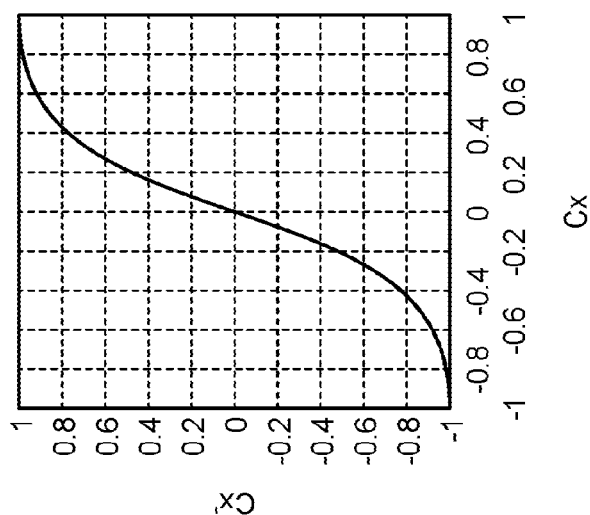
FIGS. 16A to 16C are graphs that illustrates the gain that is used during saturation correction.
Figure 16B:
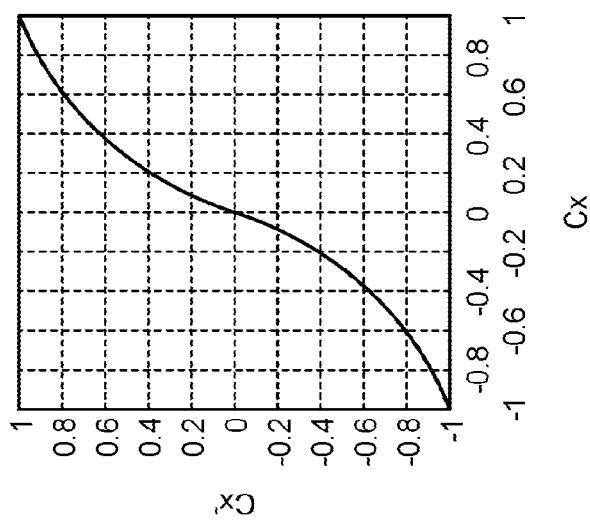
Figure 16C:
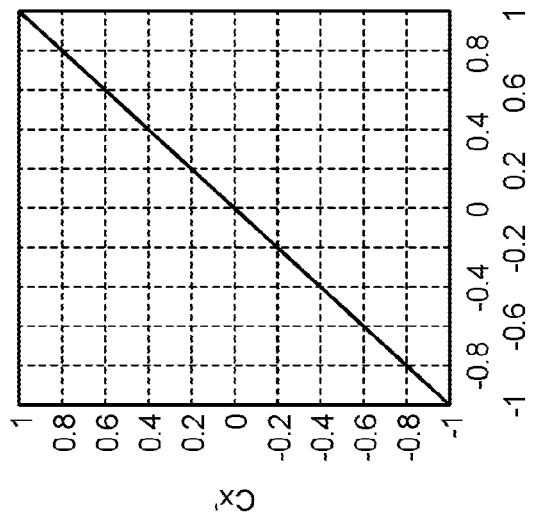

Here, with reference to FIGS. 16A to 16C, an explanation is given of how the gain is changed if an exponent part is changed from 1 to 3 in Equations (8) to (13). FIG. 16A illustrates a case where the exponent part is 1 in Equations (8) to (13), FIG. 16B illustrates a case where the exponent part is 2 in Equations (8) to (13), and FIG. 16C illustrates a case where the exponent part is 3 in Equations (8) to (13). It is understood that, although the ratio of Cx' to Cx is 1 when the exponent part is 1, as the exponent part is increased to 2 and then 3, the ratio is increased and the gain becomes larger. As the exponent part in Equations (8) to (13) includes the transmission rate information or the percentage of the number of valid pixels, if saturation correction is conducted by using Equations (8) to (13), the gain for the saturation correction may be determined in accordance with the transmission rate information or the percentage of the number of valid pixels.

Figure 17:
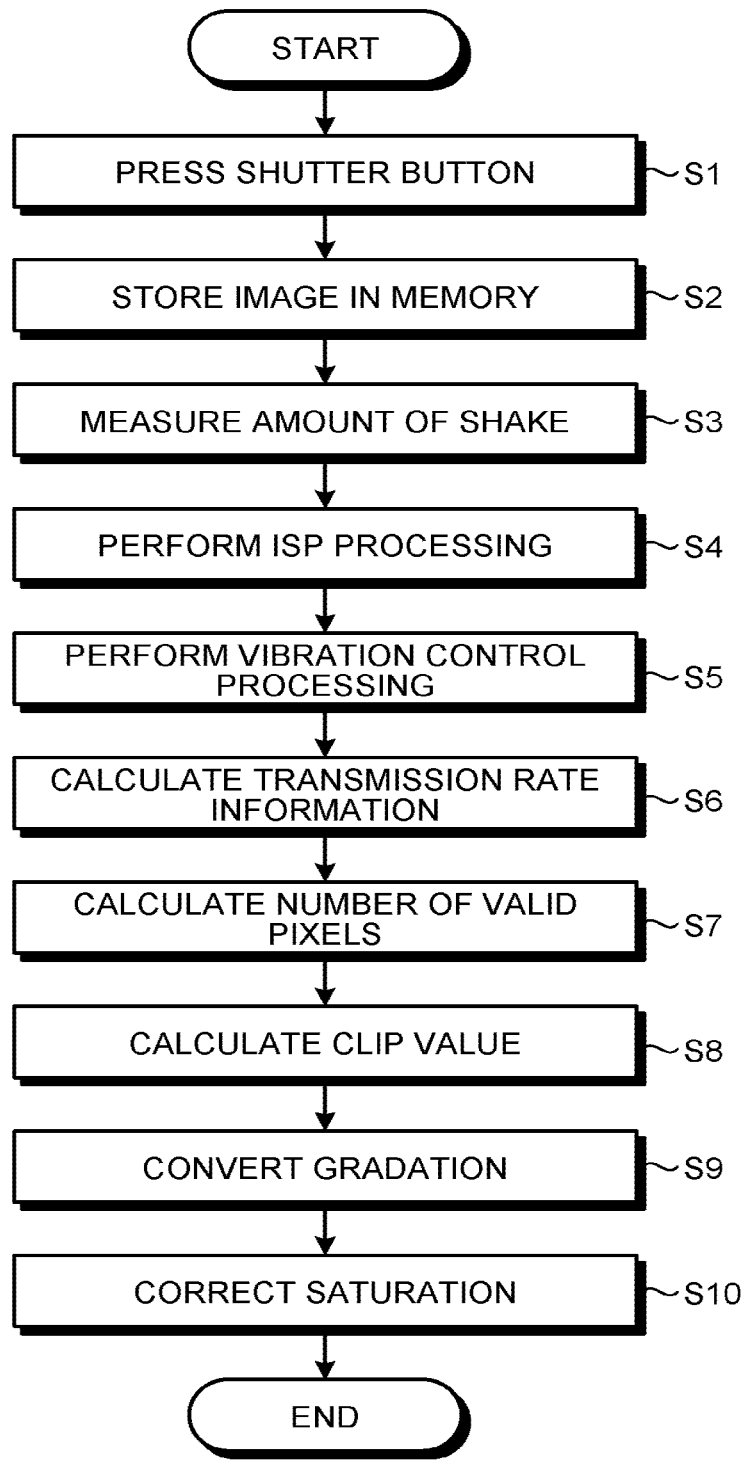
FIG. 17 is a flowchart that illustrates an example of the process that is performed by the image processing device according to the first embodiment.

Next, with reference to FIG. 17, an explanation is given of an example of the process that is performed by the image processing device 10 according to the present embodiment. FIG. 17 is a flowchart that illustrates an example of the process that is performed by the image processing device according to the first embodiment.

A user points the lens 11 of the image processing device 10 at the object that is any capturing target, and presses the shutter button (Step S1). In response, the image capturing unit 12 captures the image. Here, the explanation is given based on the assumption that vibration control processing and fog removal processing are performed; however, it is obvious that it may be yellow sand, PM2.5, or the like, instead of fog. If vibration control processing and enhancement processing (fog removal processing or contrast correction processing) are performed, the user may designate via the operating unit 15 whether vibration control processing and enhancement processing (fog removal processing or contrast correction processing) are to be performed. In response to the designation, the image processing device 10 conducts vibration control processing and enhancement processing (fog removal processing or contrast correction processing). Furthermore, some type of the image processing device 10 includes a device that automatically detects whether fog occurs by using a captured image, and such a device is capable of automatically performing fog correction without the user's consciousness.

After the controller unit 13 receives pressing of the shutter button, the controller unit 13 gives a command to the image capturing unit 12 so as to start to capture the image. In response to the command, the image capturing unit 12 opens the shutter, exposes the imaging element, conducts photoelectric conversion on the light that enters the imaging element, and outputs the image data. Then, the controller unit 13 receives the image data and stores the image data in the image memory 14 (Step S2).

Next, the N−1 frame image and the N frame image are transmitted from the image memory 14 to the shake-amount measuring unit 23 of the image processing unit 18. Here, the amount of shake of the N frame (the present frame) relative to the N−1 frame is measured by using, for example, a phase correlation technique or a block matching technique (Step S3). The amount of shake measured as described above is transmitted to the image shift unit 24 and the enhancement processing unit 26.

The image data is acquired by the image processing unit 18 from the image memory 14 via the CTL I/F 20, and typical image processing, such as shading correction, is performed by the ISP unit 21 (Step S4). Then, the image data is transmitted to and stored in the image memory 14 via the CTL I/F 20 again.

Next, the image shift unit 24 reads the image data, on which ISP processing has been conducted, from the image memory 14. Here, by using the amount of shake that is obtained at Step S3, the image data is read without changing the positional coordinates of the object in the N−1 frame and the N frame, as explained with reference to FIGS. 3 to 8. The image data, where 0 is embedded in the position of an invalid pixel as described above, is transmitted to the transmission-rate measuring unit 25 and the enhancement processing unit 26 (Step S5).

Next, the transmission-rate measuring unit 25 calculates the transmission rate information, such as the transmission rate t or dark(J), by using the dark channel technique that uses Equation (2) (Step S6). The transmission-rate measuring unit 25 transmits the calculated transmission rate information to the enhancement processing unit 26. Here, invalid pixels are exempt from a filtering operation in the dark channel technique.

Next, the CLAHE processing unit 27 divides the captured image into multiple rectangular areas (tiles) and calculates the histogram with respect to each area (tile), as described above. By obtaining the frequency value of 0 in the histogram of the peripheral section of the image, the number of invalid pixels may be obtained. This is because, in normal natural images, especially fog images, if the exposure condition is satisfied, almost nothing has the value of 0. As explained with reference to FIGS. 7 and 8, by referring to the histograms on the four areas on the upper left, upper right, lower left, and lower right, the number of invalid pixels in all the peripheral areas of the image may be calculated. Then, if the number of invalid pixels is subtracted from the number of pixels per area (tile), the number of valid pixels is calculated (Step S7). During gamma correction by the ISP unit 21, gradation conversion may be conducted on a valid pixel so as not to be 0. The amount of shake calculated by the shake-amount measuring unit 23 may be received so that the number of invalid pixels is calculated by using the value of the shake vector. In this way, the CLAHE processing unit (the pixel-number calculating unit) 27 calculates the number of valid pixels in each of the areas that are divided by the dividing unit.

Next, the CLAHE processing unit 27 calculates the clip value indicating the restriction value for the contrast and used during histogram equalizing processing (Step S8). As described above, as the clip value is larger, the enhancement is higher and, as the clip value is smaller, the enhancement is lower. First, the CLAHE processing unit 27 calculates the clip value with regard to an area other than the peripheral section of the image by using the transmission rate information based on Equation (5) or Equation (6). Next, the CLAHE processing unit 27 calculates the clip value with regard to an area in the peripheral section of the image by using the percentage of the number of valid pixels based on Equation (7) (Step S8). One of the features of the present embodiment is that the clip value is changed in accordance with the percentage of the number of valid pixels per tile.

Next, the CLAHE processing unit 27 uses the clip value of each tile (area) calculated as described above to change the form of the cumulative histogram, thereby generating an LUT (conversion table) for gradation conversion. Then, by using the LUT, non-linear gradation conversion is conducted on the image data on which vibration control processing has been performed at Step S5 (Step S9). That is, by using the clip value, histogram equalizing is conducted on each tile according to the above-described method, and each transformation curve is obtained. Then, the CLAHE processing unit 27 uses each obtained transformation curve to convert the brightness value of a pixel in each tile. In this way, the CLAHE processing unit 27 performs correction on the brightness component of a pixel. The CLAHE processing unit 27 sends the corrected image data to the saturation correcting unit 28. In the present embodiment, the process from Step S6 to S8 is performed on only the lightness signal (Y signal in the YCrCb space).

Next, the saturation correcting unit 28 conducts saturation correction on the color difference component other than the brightness component of each pixel in the image data (Step S10). First, an operation is performed to improve the saturation by applying gain to the saturation component with regard to an area other than the peripheral section of the image by using Equations (8) to (11). Next, with regard to an area in the peripheral section of the image, an operation is performed to improve the saturation by applying gain to a saturation component by using Equations (12) and (13). After saturation correction is conducted on all the pixels, the enhancement processing unit 26 determines that the enhancement processing is completed. The enhancement processing unit 26 then stores the image data in the image memory 14 via the CTL I/F 20 and terminates the process.

In this way, according to the present embodiment, as the amount of shake is larger, the enhancement intensity of an area in the peripheral section of the image is lowered; thus, it is possible to reduce flickering in the peripheral section of an image. Furthermore, if there is a decrease in the number of valid pixels in the peripheral section of an image, correction is intense and noise is sometimes more noticeable. However, noise in the peripheral section of the image can be reduced by preventing excessive correction. Thus, even if both the vibration control processing and the area-division type enhancement processing are performed in combination, flickering does not occur in the peripheral sections of images, and the visibility of images may be improved.

Second Embodiment

Next, an explanation is given of a second embodiment. An example of the configuration of the image processing device 10 is the same as that in the first embodiment. It is different from the first embodiment in only CLAHE processing performed by the enhancement processing unit 26. The details are explained below.

Figure 18:
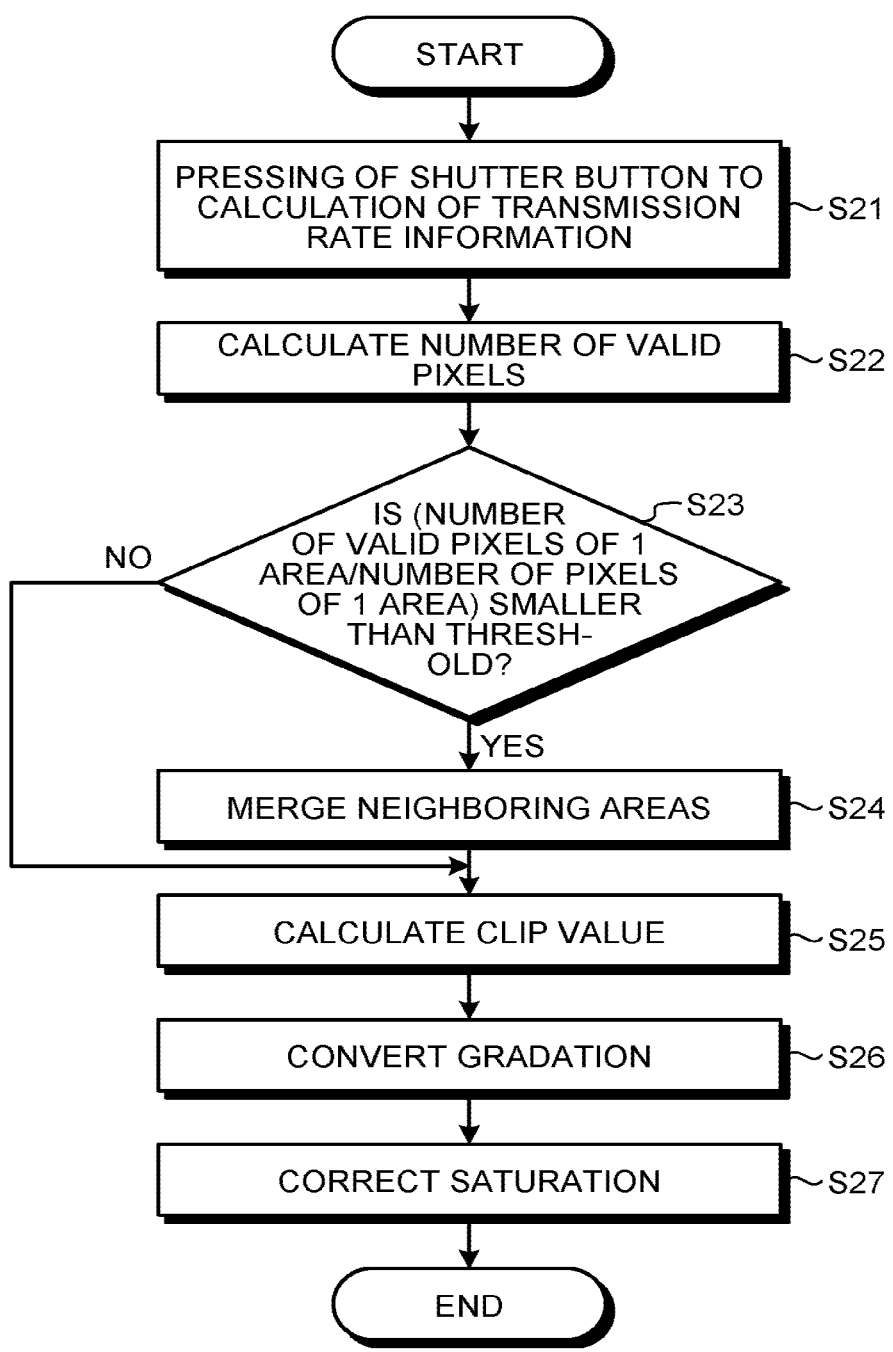
FIG. 18 is a flowchart that illustrates an example of the process that is performed by the image processing device according to a second embodiment.

With reference to FIG. 18, an explanation is given of an example of the process that is performed by the image processing device 10 according to the second embodiment. FIG. 18 is a flowchart that illustrates an example of the process that is performed by the image processing device according to the second embodiment. Here, for the same process as that in FIG. 17 according to the first embodiment, the corresponding steps are illustrated and their detailed explanations are omitted.

Step S21 is the same as the process from Step S1 to Step S6 in FIG. 17. Step S22 is the same as Step S7 in FIG. 17. Step S25 to Step S27 are the same as Step S8 to Step S10 in FIG. 17. An explanation is given below of Steps S23 and S24.

After the number of valid pixels is calculated with regard to each of the tiles (areas) that are divided from the image at Step S22, the CLAHE processing unit 27 calculates the ratio of the number of valid pixels of a single area to the number of pixels of the single area ((the number of valid pixels of one area)/(the number of pixels of one area)) with regard to each tile (area) in the peripheral section of the image. By performing this calculation, it is possible to determine the percentage of valid pixels in one area to generate the histogram. That is, as the calculated ratio of the number of valid pixels is lower, the LUTs in the N−1 frame and the N frame are easily made in different forms, and flickering on the screen is increased. The CLAHE processing unit 27 determines whether the calculated value is smaller than a predetermined threshold (Step S23).

If the calculated value is larger than the predetermined threshold (Step S23: No), the process proceeds to Step S25 and continues. If the calculated value is smaller than the predetermined threshold (Step S23: Yes), the neighboring areas are merged to increase the number of valid pixels (Step S24). Next, the process from Step S25 to Step S27 is performed. If the above-described process is completed for each tile (area), the flow is terminated.

Figure 19:
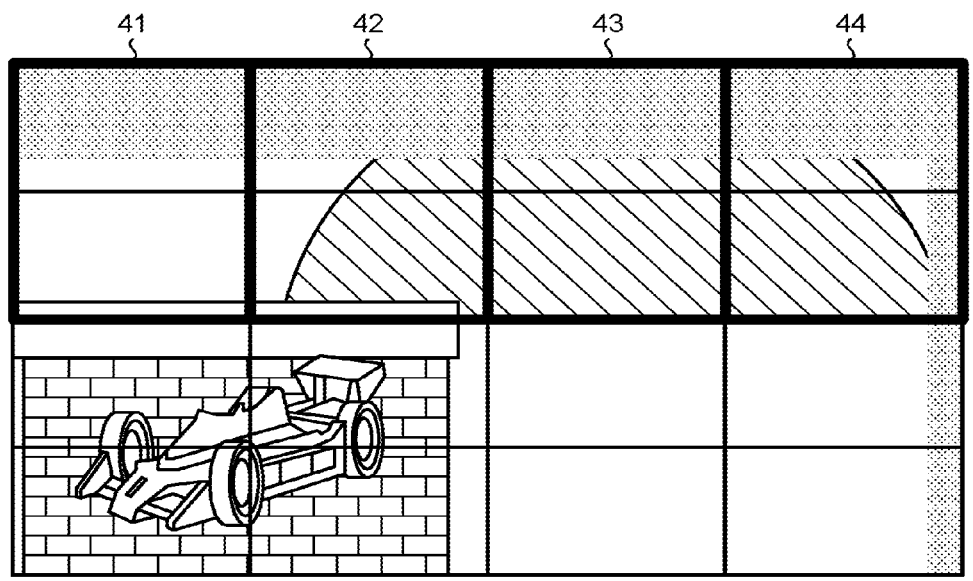
FIG. 19 is a diagram that illustrates merging of the neighboring areas.
Figure 20:
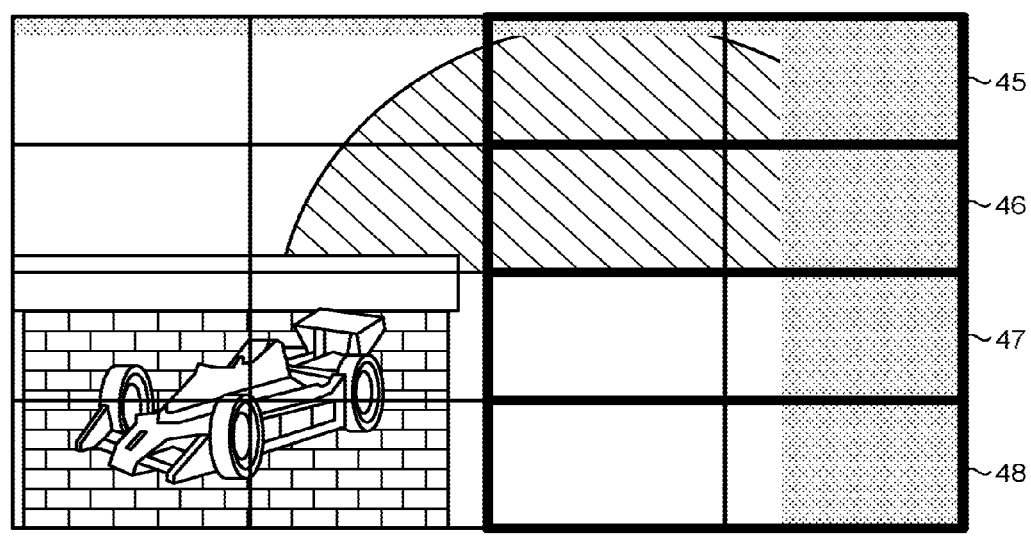
FIG. 20 is a diagram that illustrates merging of the neighboring areas.

Here, an explanation is given of merging of the neighboring areas with reference to FIGS. 19 to 22. In FIGS. 19 to 20, the tiles (areas), which are divided into 4×4=16, are 1-1, 1-2, 1-3, and 1-4 areas from the top of the first left column, 2-1, 2-2, 2-3, and 2-4 areas from the top of the second left column, 3-1, 3-2, 3-3, and 3-4 areas from the top of the third left column, and 4-1, 4-2, 4-3, and 4-4 areas from the top of the fourth left column.

FIG. 19 illustrates a case where the number of valid pixels is small in the tiles (areas) on the top, i.e., the 1-1, 2-1, 3-1, and 4-1 areas (a first area where the number of valid pixels is equal to or less than the predetermined threshold). In the example of FIG. 19, the 1-1 area (the first area) is merged with the 1-2 area (a second area where the number of valid pixels is equal to or more than the predetermined threshold) to obtain a new area (a third area) 41. Furthermore, in the example, the 2-1 area is merged with the 2-2 area to obtain a new area 42. Furthermore, in the example, the 3-1 area is merged with the 3-2 area to obtain a new area 43. Moreover, in the example, the 4-1 area is merged with the 4-2 area to obtain a new area 44. These processes correspond to a "combining unit" in claims.

FIG. 20 illustrates a case where the number of valid pixels is small in the tiles (areas) on the right side, i.e., the 4-1, 4-2, 4-3, and 4-4 areas. In the example of FIG. 20, the 4-1 area is merged with the 3-1 area to obtain a new area 45. Furthermore, in the example, the 4-2 area is merged with the 3-2 area to obtain a new area 46. Furthermore, in the example, the 4-3 area is merged with the 3-3 area to obtain a new area 47. Moreover, in the example, the 4-4 area is merged with the 3-4 area to obtain a new area 48.

Figure 21:
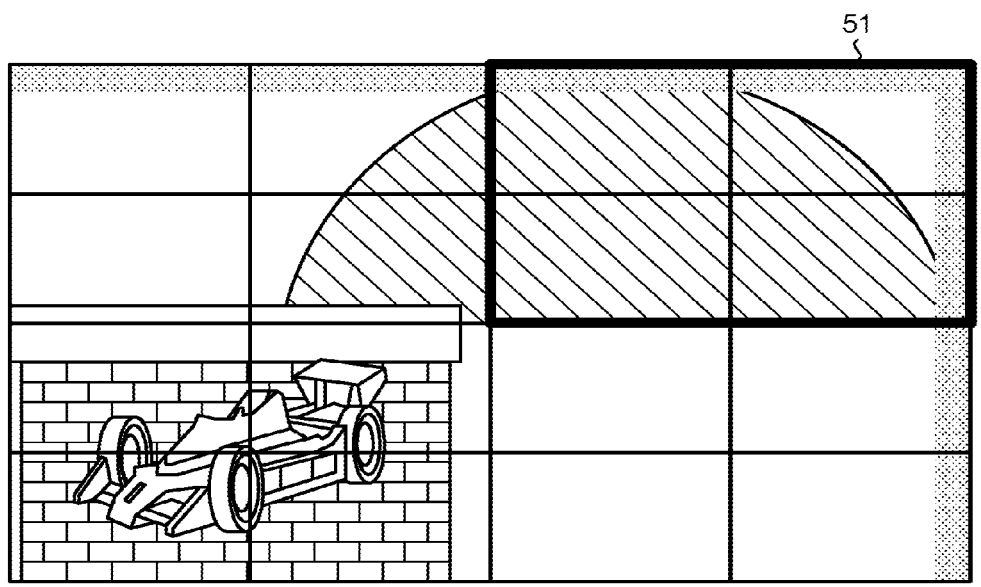
FIG. 21 is a diagram that illustrates merging of the neighboring areas.

FIG. 21 illustrates a case where the number of valid pixels is small in the upper right tile (area), i.e., the 4-1 area. In the example of FIG. 21, the 4-1 area is merged with the 4-2, 3-1, and 3-2 areas to obtain a new area 51.

Figure 22:
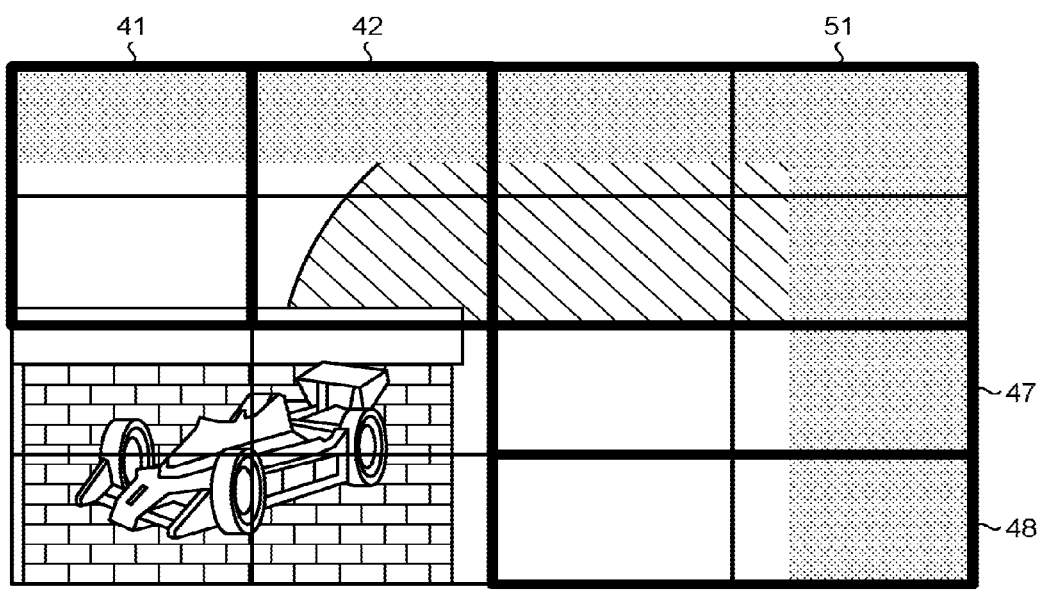
FIG. 22 is a diagram that illustrates merging of the neighboring areas.

FIG. 22 illustrates a case where the number of valid pixels is small in the right tiles (areas), i.e., the 4-1, 4-2, 4-3, and 4-4 areas and in the top tiles (areas), i.e., the 1-1, 2-1, 3-1, and 4-1 areas. In the example of FIG. 22, the 1-1 area is merged with the 1-2 area to obtain the new area 41. Furthermore, in the example, the 2-1 area is merged with the 2-2 area to obtain the new area 42. Furthermore, in the example, the 4-1 area is merged with the 4-2, 3-1, and 3-2 areas to obtain the new area 51. Furthermore, in the example, the 4-3 area is merged with the 3-3 area to obtain the new area 47. Moreover, in the example, the 4-4 area is merged with the 3-4 area to obtain the new area 48.

As described above, merging is conducted on only areas in the periphery of an image where the percentage of the number of valid pixels is smaller (insufficient) than a predetermined threshold. In areas located inward from the areas in the periphery of an image, all the pixels are valid pixels; therefore, if merging is conducted by using an area located inward from the area in the periphery, the number of valid pixels is increased, and a stable histogram is formed. As the LUT of the area located inward from the peripheral section of an image is sometimes changed to a certain degree, it is possible to use a technique to merge one of the areas in the peripheral section of the image. Here, the predetermined threshold may be optionally set.

As described above, according to the present embodiment, if the amount of shake is large and the number of valid pixels of an area in the peripheral section of the image is insufficient, the image area is increased so that flickering on the peripheral section of the image may be reduced. Furthermore, as the enhancement is not reduced, the contrast in the peripheral section of the image can be improved.

Third Embodiment

Next, an explanation is given of a third embodiment. An example of the configuration of the image processing device 10 is the same as that in the first embodiment. It is different from the first embodiment in only the CLAHE processing of the enhancement processing unit 26. The details are explained below.

Figure 23:
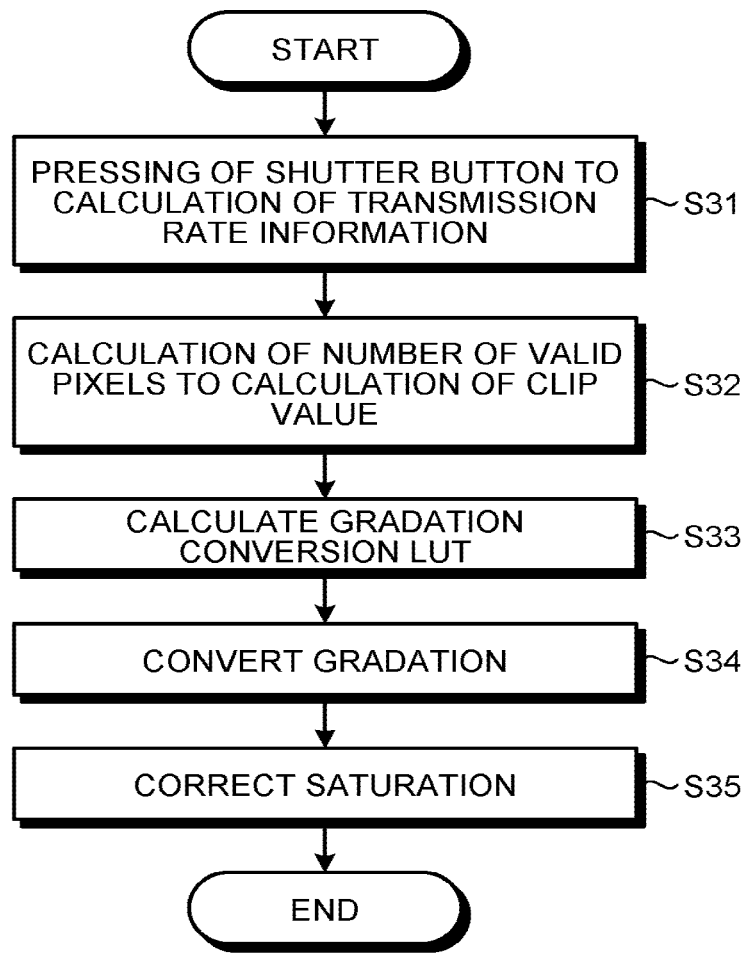
FIG. 23 is a flowchart that illustrates an example of the process that is performed by the image processing device according to a third embodiment.

With reference to FIG. 23, an explanation is given of an example of the process that is performed by the image processing device 10 according to the third embodiment. FIG. 23 is a flowchart that illustrates an example of the process that is performed by the image processing device according to the third embodiment. Furthermore, for the same process as that in FIG. 17 according to the first embodiment, the corresponding steps are illustrated and their detailed explanations are omitted.

Step S31 is the same as the process from Step S1 to Step S6 in FIG. 17. Step S32 is substantially the same as Steps S7 and S8 in FIG. 17; however, the present embodiment is different in using the clip value where no consideration is given to the amount of shake. Steps S34 and S35 are the same as Steps S9 and S10 in FIG. 17. An explanation is given below of Steps S32 and S33.

At Step S32, the clip value k is calculated by using Equation (6) where no consideration is given to the amount of shake. Next, the CLAHE processing unit 27 uses the clip value for each tile (area) calculated as described above to change the form of the cumulative histogram, and calculates the LUT for gradation conversion (Step S33). Then, by using the LUT, non-linear gradation conversion is conducted on the image data on which vibration control processing has been performed (Step S34), and then saturation correction is performed (Step S35).

Here, an explanation is given of blend processing of the LUT of the N−1 frame and the LUT of the N frame, performed when the LUT is calculated according to the present embodiment. First, if no consideration is given to vibration control processing, blend processing is performed as in the following Equation (14).

$$N \text{ frame's LUT} = (N-1 \text{ frame's LUT}) \times (1-a) + (\text{LUT calculated from } N \text{ frame image}) \times a \quad (14)$$

In Equation (14), "a" is the blend percentage with the N−1 frame, and "a" is a value from 0 to 1.

As the value of "a" is closer to 1, the calculation result of the image of the N frame is regarded as important and, as the value of "a" is closer to 0, equalization with the previous is heightened so that the difference from the N−1 frame becomes small. Blend processing is effective processing for the scene where the light source is rapidly changed due to, for example, light flashing or for the scene where the camera is blocked by an obstacle for a moment, even if shake does not occur in images.

Next, the blend percentage b of an area in the peripheral section of the image is defined as in the following Equation (15).

$$\text{Blend percentage } b = (\text{blend percentage } a) \times (\text{adjustment parameter } k \text{ blend}) \times \{(\text{number of valid pixels of one area})/(\text{number of pixels of one area})\} \quad (15)$$

For an area other than the areas in the peripheral section of the image or for an area where there is no invalid pixels, the blend percentage "a" in Equation (14) may be used without change. Conversely, for an area that is in the peripheral section of the image and that has a few number of valid pixels due to shake, the blend percentage is lower. Thus, the LUT of the N−1 frame is regarded as important as compared to the calculation result of the N frame, and the LUT is less changed, whereby flickering on the peripheral section of the image may be reduced.

Furthermore, if the number of valid pixels of one tile (area) is significantly small, the gap from the neighboring area (area on the inner side) is large. Usually, bilinear blend is conducted by using the neighboring area; however, if there is a large gap, blend may be conducted on areas by giving more weight to the area (the area on the inner side) where there is a larger number of valid pixels.

According to the present embodiment, gradation conversion is conducted on the image data that is input by using the LUT on which the blend processing has been performed as explained by using Equations (14) and (15). As described above, in conducting enhancement processing on each area of the input image that is input in chronological order, the enhancement processing unit (change-table calculating unit) 26 uses (blends) a first parameter (LUT) for the enhancement processing performed on each area of the N−1-th input image, and a second parameter (LUT) for the enhancement processing performed on each area of the N-th input image, to calculate the conversion table (LUT) for conducting gradation conversion, which is used during the enhancement processing and is performed on each area of the N-th input image.

As described above, according to the present embodiment, as the amount of shake is larger, the blend percentage of the N−1-th frame in an area of the peripheral section of the image is increased, whereby flickering on an area in the peripheral section of the image may be reduced.

Fourth Embodiment

Next, an explanation is given of a fourth embodiment. An example of the configuration of the image processing device 10 is the same as that in the first embodiment. The fourth embodiment is different in only the method of merging the neighboring areas during the CLAHE processing of the enhancement processing unit 26 according to the second embodiment. The details are explained below. Furthermore, the process that is performed by the image processing device 10 according to the fourth embodiment is the same as that in FIG. 18 according to the second embodiment.

The fourth embodiment is an example of calculation of a histogram by merging the neighboring areas as the number of valid pixels in one tile (area) is small. According to the second embodiment, CLAHE is conducted by simply merging the neighboring areas. According to the fourth embodiment, segmentation is conducted on an image, and a histogram is calculated in such a manner that the ratio of segmentation in a certain area of the N−1 frame becomes the same as the ratio of segmentation in a combination of the certain area of the N frame and its neighboring area.

FIGS. 24 to 27 are diagrams that illustrate merging of the neighboring areas. In FIGS. 24 to 27, the tiles (areas), which are divided into 4×4=16, are the 1-1, 1-2, 1-3, and 1-4 areas from the top of the first left column, the 2-1, 2-2, 2-3, and 2-4 areas from the top of the second left column, the 3-1, 3-2, 3-3, and 3-4 areas from the top of the third left column, and the 4-1, 4-2, 4-3, and 4-4 areas from the top of the fourth left column.

Figure 24:
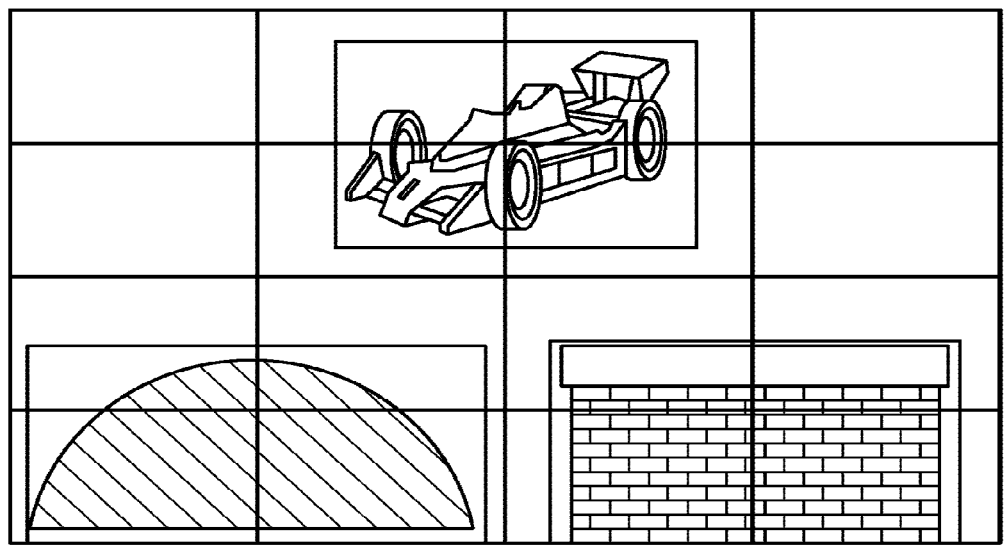
FIG. 24 is a diagram that illustrates merging of the neighboring areas.

As illustrated in FIG. 24, division is conducted based on each object within the image. In the example of FIG. 24, an object is divided into rectangles; however, division may be conducted based on the outline of an object. As the method of dividing an object, a known technology called segmentation may be used. Segmentation may include, for example, dynamic outline, level set technique, or average value shift. Furthermore, in the case of a fog scene, it may be divided in accordance with the transmission rate of fog as described above. Particularly, when fog occurs, the contrast is decreased, and it is often difficult to acquire the feature value of an object with high accuracy. Therefore, the feature value of an object may be substituted by the transmission rate information on fog.

Figure 25:
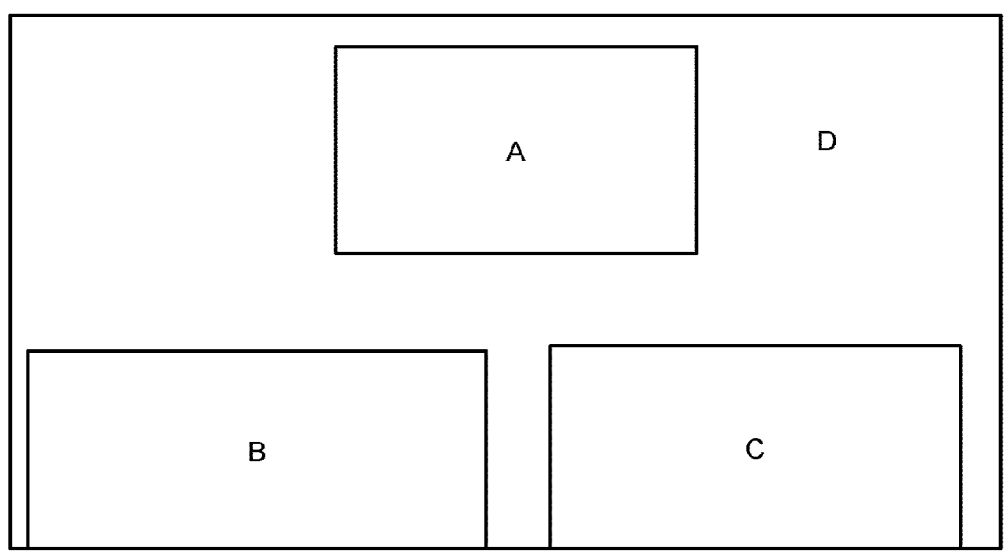
FIG. 25 is a diagram that illustrates merging of the neighboring areas.

In FIG. 25, the label information indicating the type of object within an image is applied after segmentation is conducted. For example, the vehicle is applied with A label, the mountain is applied with B label, the wall is applied with C label, and the background is applied with D label. The segmentation corresponds to a "label-information applying unit" in a claim.

Figure 26:
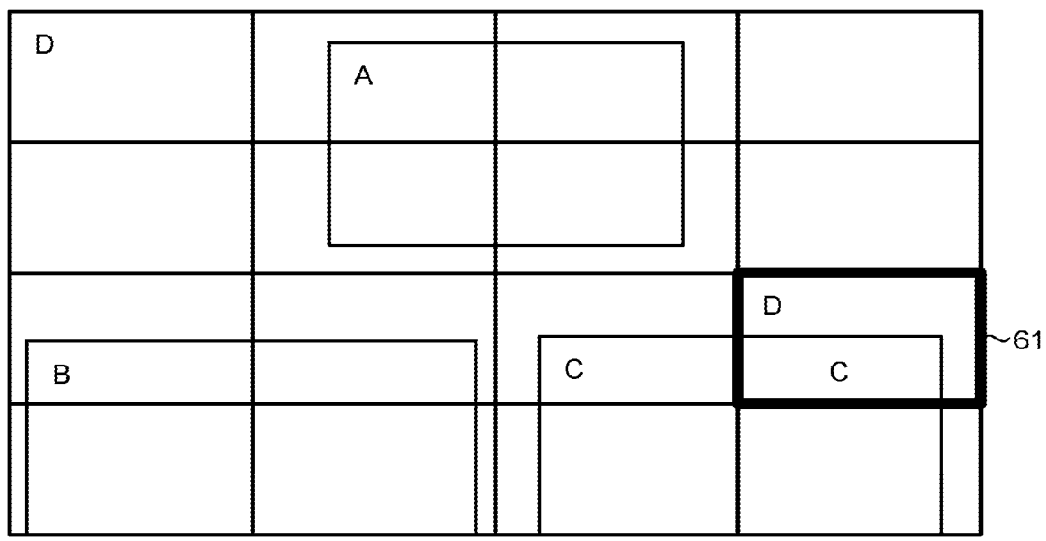
FIG. 26 is a diagram that illustrates merging of the neighboring areas.

FIG. 26 illustrates the N−1 frame. A focus is given to a 4-3 area 61 that is the rightmost and the third from the top. The 4-3 area 61 is an area where the C label and the D label are mixed. For the area where the labels are mixed, for example, the ratio of the number of pixels with label C to the number of pixels with label D is calculated. Calculation of the ratio of the number of pixels is performed on the area where two or more types of labels are mixed in all the areas in the peripheral section of the image.

Figure 27:
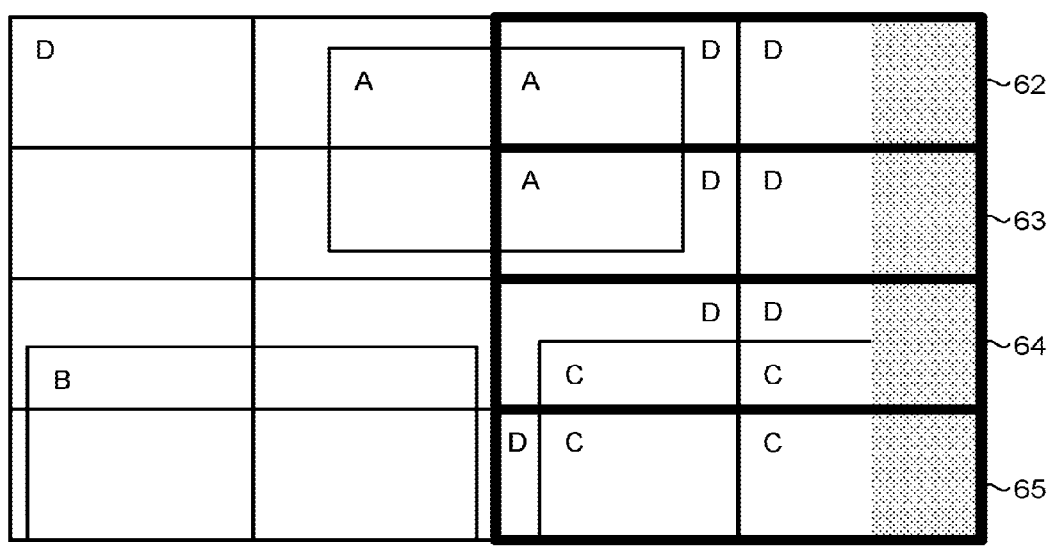
FIG. 27 is a diagram that illustrates merging of the neighboring areas.

FIG. 27 illustrates the N frame. An explanation is given of a case where there are invalid pixels on the right side of the N frame and it is determined that, for example, the number of valid pixels in all the areas (the 4-1 to 4-4 areas) on the right side is insufficient (the ratio of the number of valid pixels is lower than a predetermined threshold) at Step S23 of FIG. 18.

With regard to the 4-1 area, there is only the D label in the N−1 frame (FIG. 26), and therefore only the pixels with the D label in the neighboring 3-1 area are added as the targets for histogram calculation (an area 62). Specifically, the 4-1 area (first area), of which the number of valid pixels is equal to or less than a predetermined threshold, is combined with the 3-1 area (second area) that is the neighboring area and that has the same label information as that of the first area, whereby a third area is obtained. This processing corresponds to a "combining unit" in claims. As described above, if the label information is used to determine whether it is an area for calculation of a histogram, the neighboring area is used as only the target for calculation of a histogram. When calculating the LUT of the 3-1 area in the N frame (FIG. 27), the entire 3-1 area is used as it is. Note that, in the second embodiment, the 3-1 area and the 4-1 area are merged to generate a single area with double size, and therefore the histograms and the LUTs of the 3-1 area and the 4-1 area are the same.

As is the case with the 4-1 area, in the case of the 4-2 area, only the pixels with the D label in the 3-2 area are added as the targets for calculation of a histogram (an area 63).

In the case of the 4-3 area, the pixels with the C label and the pixels with the D label are mixed as described above; therefore, the pixels in the neighboring 3-3 area are set as the targets for calculation of a histogram in such a manner that the same ratio is obtained as that calculated for the N−1 frame (FIG. 26) (an area 64). Specifically, if the pixels with the C label and the pixels with the D label in the N frame are set as the targets for calculation of a histogram at the same ratio (C:D) as that in the N−1 frame, the pixels with the C label are too many relative to the pixels with the D label. Therefore, all the pixels with the D label in the 3-3 area are added for the histogram, and some of the pixels with the C label in the 3-3 area are removed from the targets for calculation of the histogram so that the same ratio is maintain between the N−1 frame and the N frame.

A specific explanation is given by using the numbers. The assumptions are:
(1) In the 4-3 area of the N−1 frame, the number of pixels with the C label=100, and the number of pixels with the D label=300;
(2) In the 4-3 area of the N frame, the number of pixels with the C label=60, and the number of pixels with the D label=60; and
(3) In the 3-3 area of the N frame, the number of pixels with the C label=100, and the number of pixels with the D label=300.

If the 4-3 area and the 3-3 area in the N frame (FIG. 27) are combined, the ratio of the pixels with the C label to the pixels with the D label (C:D) needs to be 1:3; therefore, C:D=(60+60):(60+300). This means that the number of pixels with the C label in the 3-3 area is 60 and the number of pixels with the D label is 300, and 100−60=40 pixels among the pixels with the C label in the 3-3 area are removed from the targets for addition of a histogram. Furthermore, the same number of pixels as that in the N−1 frame (FIG. 26) may be regarded as the targets for calculation of the histogram. In such a case, C:D=(60+40):(60+240), and 40 pixels among the pixels with the C label and 240 pixels among the pixels with the D label in the 3-3 area are set as the targets for calculation of the histogram.

In the same manner, with regard to the 4-4 area, the same ratio (C:D) is set by using the 3-4 area. Furthermore, as described above, if all the pixels in the neighboring area are not used as the targets for calculation of a histogram, a pixel that is located at a position closer to an area in the periphery of an image may be set as the target for calculation of a histogram.

As described above, according to the fourth embodiment, if the amount of shake is large and if the number of valid pixels in an area of the peripheral section of the image is insufficient, the image area is increased in accordance with the feature value of the image (the label information that indicates the type of object in the image) so that the LUT of the N−1 frame is more approximated, whereby it is possible to further reduce flickering on the screen, compared to a case where the image areas are simply combined.

In the above explanation, the target image on which contrast adjustment is conducted is the image that is captured and acquired by the image processing device 10; however, the image captured by the image processing device 10 is not a limitation. Therefore, it may be, for example, an image that is received and acquired from a server, or the like, via a network, or an image that is recorded on a recording medium, such as a CD-ROM or an SD card.

Furthermore, a configuration may be such that the software (program) executed by the image processing device 10 according to each of the above-described embodiments is provided by being recorded, in the form of a file that is installable or executable, in a recording medium readable by a computer, such as a floppy (registered trademark) disc, a compact disc (CD), a compact disc-recordable (CD-R), a compact disc read only memory (CD-ROM), a digital versatile disc (DVD), an SD memory card, or a universal serial bus (USB) memory.

Furthermore, a configuration may be such that the software (program) executed by the image processing device 10 according to the present embodiment is stored in a computer connected via a network, such as the Internet, and provided by being downloaded via the network. Moreover, a configuration may be such that the program executed by the image processing device 10 according to the present embodiment is provided or distributed via a network such as the Internet.

According to the present invention, it is possible to improve the visibility of images.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An image processing device comprising:
processing circuitry configured to
receive an input of an image in chronological order;
in each cycle in which an image is input, measure an amount of shake of the image;
correct shake of the image in accordance with the amount of shake measured;

divide the image corrected into multiple areas in accordance with a specified division condition;
calculate a histogram indicating a feature value of an image, for each of the areas divided; and
determine processing details of enhancement processing to change a form of the histogram for each of the areas and an enhancement intensity in accordance with the amount of shake of the image measured, and to conduct enhancement processing on each of the areas based on the histogram that is calculated for each of the areas.

2. The image processing device according to claim 1, wherein, in a case where the amount of shake of the image is large, the processing circuitry sets a low enhancement intensity for enhancement processing that is performed on the area in a peripheral section of the image among the areas and, in a case where the amount of shake of the image is small, sets a high enhancement intensity for enhancement processing that is performed on the area in the peripheral section of the image.

3. The image processing device according to claim 1, wherein the processing circuitry is further configured to,
when performing enhancement processing on the area of input images that are input in chronological order, use a first parameter for enhancement processing performed on the area of an N−1-th input image, and a second parameter for enhancement processing performed on the area of an N-th input image, to calculate a conversion table for conducting gradation conversion, the conversion table being used during enhancement processing performed on the area of the N-th input image,
calculate the conversion table in accordance with the amount of shake of the image, and
use the conversion table to conduct the enhancement processing.

4. The image processing device according to claim 1, wherein the processing circuitry is further configured to calculate a number of valid pixels for each of the areas that are divided,
combine a first area of which the number of valid pixels is equal to or less than a predetermined threshold, and a second area which is a neighboring area and of which the number of valid pixels is equal to or more than the predetermined threshold, thereby obtaining a third area, and
calculate, for the third area, the histogram indicating a feature value of an image.

5. The image processing device according to claim 4, wherein the processing circuitry is further configured to
apply label information that indicates a type of object within an image in the area, and
combine a first area of which the number of valid pixels is equal to or less than a predetermined threshold, and a second area which is a neighboring area and of which the label information is identical to the label information of the first area, thereby obtaining a third area.

6. The image processing device according to claim 4, wherein the processing circuitry is further configured to
measure or calculate, from the image, a transmission rate of light of each of the areas, or data that is correlated with the transmission rate as transmission rate information, and
combine a first area of which the number of valid pixels is equal to or less than a predetermined threshold, and a second area which is a neighboring area and of which the transmission rate information is classified into a predetermined range together with the first area, thereby obtaining a third area.

7. The image processing device according to claim 1, wherein, in a case where the amount of shake of the image is large, the processing circuitry sets a clip value to be small and, in a case where the amount of shake of the image is small, sets the clip value to be large, the clip value indicating a restriction value for contrast and being used for changing the form of the histogram calculated for each of the areas.

8. A non-transitory recording medium including computer readable programmed instructions performed by an image processing device, the instructions causing the image processing device to execute:
receiving an input of an image in chronological order;
measuring, in each cycle in which an image is input, an amount of shake of the image;
correcting shake of the image in accordance with the amount of shake measured;
dividing the image corrected into multiple areas in accordance with a specified division condition;
calculating a histogram indicating a feature value of an image, for each of the areas divided at the dividing;
determining processing details of enhancement processing to change a form of the histogram for each of the areas and an enhancement intensity in accordance with the amount of shake of the image measured at the measuring; and
conducting enhancement processing on each of the areas based on the histogram that is calculated for each of the areas, in accordance with the processing details that are determined at the determining.

* * * * *